US005463444A

United States Patent [19]

Watanabe et al.

[11] Patent Number: 5,463,444

[45] Date of Patent: Oct. 31, 1995

[54] HEAT DEVELOPMENT PROCESSOR WHEREIN STEAM IS DISCHARGED FROM A HEAT SENSITIVE MATERIAL

[75] Inventors: Naoki Watanabe; Hirokazu Okutsu; Masakazu Isozaki; Kenji Inoue, all of Kanagawa, Japan

[73] Assignee: Fuji Photo Film Co., Ltd., Kanagawa, Japan

[21] Appl. No.: 125,654

[22] Filed: Sep. 23, 1993

[30] Foreign Application Priority Data

| | | | |
|---|---|---|---|
| Sep. 24, 1992 | [JP] | Japan | 4-254790 |
| Dec. 4, 1992 | [JP] | Japan | 4-325723 |
| Dec. 4, 1992 | [JP] | Japan | 4-325725 |

[51] Int. Cl.[6] .............................. G03B 27/32; H05B 1/00

[52] U.S. Cl. .............................. 355/27; 219/216; 355/285

[58] Field of Search .............................. 355/27, 285, 286, 355/290; 219/216

[56] References Cited

U.S. PATENT DOCUMENTS

| | | | |
|---|---|---|---|
| 4,315,136 | 2/1982 | Block et al. | 219/216 |
| 4,518,845 | 5/1985 | Svendsen | 219/216 |
| 4,566,783 | 1/1986 | Schwierz et al. | 355/289 |
| 4,624,558 | 11/1986 | Johnson | 355/28 X |
| 4,825,074 | 4/1989 | Yoshikawa | 355/27 X |
| 5,115,279 | 5/1992 | Nishikawa et al. | 355/290 |
| 5,313,248 | 5/1994 | Mita et al. | 355/27 |

FOREIGN PATENT DOCUMENTS

| | | |
|---|---|---|
| 5289915 | 7/1977 | Japan . |
| 61-123838 | 6/1986 | Japan . |
| 1224930 | 9/1989 | Japan . |
| 219710 | 1/1990 | Japan . |

OTHER PUBLICATIONS

Abstract of Japanese Utility Model Application Laid–Open (Kokai) No. 1–172046 Dec. 4, 1989 "Roller Heating Device".

Abstract of Japanese Utility Model Application Laid–Open (Kokai) No. 1–172047 Dec. 6, 1989 "Roller Heating Device".

Abstract of Japanese Utility Model Application Laid–Open (Kokai) No. 2–58236 Apr. 26, 1990 "Copier of Heat–Developing Type".

Abstract of Japanese Utility Model Application Laid–Open (Kokai) No. 2–71842 May 31, 1990 "Copier of Heat–Developing Type".

Abstract of Japanese Utility Model Application Laid–Open (Kokai) No. 1–139267 Sep. 22, 1989 "Roller Heating Device".

Abstract of Japanese Utility Model Application Laid–Open (Kokai) No. 1–139393 Sep. 22, 1989 "Roller Heating Device".

Abstract of Japanese Utility Model Application Laid–Open (Kokai) No. 1–139265 Sep. 22, 1989 "Roller Heating Device".

Abstract of Japanese Utility Model Application Laid–Open (Kokai) No. 1–139264 Sep. 22, 1989 "Roller Heating Device".

Abstract of Japanese Utility Model Application Laid–Open (Kokai) No. 1–139263 Sep. 22, 1989 "Roller Heating Device".

*Primary Examiner*—Fred L. Braun

*Attorney, Agent, or Firm*—Sughrue, Mion, Zinn, Macpeak & Seas; Richard C. Turner; Marc Kaufman

[57] ABSTRACT

A heat development processor includes a heat roller whose peripheral surface is heated to a predetermined temperature, the heat roller being adapted to transport in close contact therewith a heat-developable light-sensitive material with a latent image formed thereon, so as to heat develop the heat-developable light-sensitive material; and a backup roller disposed in face-to-face relation with the heat roller and having a gap between the same and the heat roller, the gap corresponding to or greater than the thickness of the heat-developable light-sensitive material. Since a gap is provided between the heat roller and the backup roller, a nipping force does not act between them, making it possible to squeeze out steam from between the heat-developable light-sensitive material and the peripheral surface of the heat roller.

9 Claims, 16 Drawing Sheets

HEAT DEVELOPMENT PROCESSOR WHEREIN STEAM IS DISCHARGED FROM A HEAT SENSITIVE MATERIAL

BACKGROUND OF THE INVENTION

1. Field of the Invention

The present invention relates to a heat development processor having a heat roller whose peripheral surface is heated to a predetermined temperature by a heat source so as to form a visible image on a heat-developable light-sensitive material with a latent image formed thereon, by effecting heat development while transporting the heat-developable light-sensitive material in close contact with a portion of the peripheral surface of the heat roller.

2. Description of the Related Art

As a means of heat treating a heat-developable light-sensitive material, a heat roller is generally used. Namely, as a heat-developable light-sensitive material with a latent image formed thereon is transported while being brought into close contact over a predetermined length with a peripheral surface of a heat roller heated to a predetermined temperature, the heat-developable light-sensitive material wound around the peripheral surface is heated, and an image is made visible on the heat-developable light-sensitive material.

As a heat-developable light-sensitive material, it is possible to use a material in which one of the following materials is provided on the surface of a base: one in which two components of a two-component-type heat-sensitive color-development medium are separated from each other by a microcapsule containing a photocurable composition placed therebetween (refer to Japanese Patent Application Laid-Open No. 89915/1977); one in which a layer containing a photopolymerizable composition and a vinyl monomer having an acidic group, an isolating layer, and a layer consisting of an electron donative colorless dye are laminated (refer to Japanese Patent Application Laid-Open No. 123838/1986); one which has a plurality of light-sensitive layers which develop different colors, each light-sensitive layer having a central wavelength (refer to Japanese Patent Application Laid-Open Nos. 224930/1989 and 19710/1990).

Since the heat roller heats the heat-developable light-sensitive material in direct contact therewith, the heat roller has higher thermal efficiency and a shorter processing time than other heating means (hot air, an infrared heater, etc.), and the apparatus becomes compact.

However, if the heat-developable light-sensitive material is subjected to heat treatment, water contained in the heat-developable light-sensitive material evaporates and is released in the form of steam. For this reason, steam is accumulated between the contact surface of the heat-developable light-sensitive material and the contact surface of the heat roller. The pressure of the steam can cause a portion of the heat-developable light-sensitive material, which must be kept in close contact with the heat roller, to float, so that its contact with the heat roller becomes insufficient, possibly resulting in uneven development. In addition, the floating of the portion of the heat-developable light-sensitive material causes a decline in the efficiency of heat transfer.

To overcome this problem, it is conceivable to adopt a means in which, before the heat-developable light-sensitive material is wound around the heat roller in close contact therewith, the water contained in the heat-developable light-sensitive material is removed in advance by preheating the heat-developable light-sensitive material such as by blowing hot air onto it or applying infrared rays onto it or the like.

With the above-described conventional means, however, it is necessary to provide a preheating zone for removing the water in advance, so that the processing time becomes long and the apparatus becomes large in size.

Meanwhile, to bring the heat-developable light-sensitive material into close contact with the heat roller over a predetermined length, such a heat development processor adopts a technique in which a plurality of backup rollers are arranged in face-to-face relation with the peripheral surface of the heat roller, and tension is applied to the heat-developable light-sensitive material by these backup rollers. In so doing, it is conceivable to weaken the nipping force of the backup roller located on the winding-start side so as to squeeze out bubbles which are released.

With such a technique, however, there are cases where bubbles remain, and the removal of steam cannot be effected reliably. In addition, the adjustment of the nipping force of the backup rollers is difficult.

On the other hand, to bring the heat-developable light-sensitive material (particularly its leading and trailing ends) into close contact with the peripheral surface of the heat roller over a predetermined length thereof as described above, it is effective to provide a guide plate (planar member) in face-to-face relation with the heat roller between the backup rollers or at other appropriate positions.

However, since such a guide plate is secured to the apparatus, the guide plate .comes into slidable contact with an emulsion surface of the heat-developable light-sensitive material which is transported in close contact with the heat roller. For this reason, as a result of an experiment it became evident that if the surface of the guide plate is made flat and smooth, the heat-developable light-sensitive material adheres to the guide plate, and the threading characteristic for threading the heat-developable light-sensitive material becomes deteriorated. In particular, the generation of steam described above promotes adherence.

In other words, this adherence hampers the smooth transportation of the heat-developable light-sensitive material with the rotation of the heat roller, and the amount of heat received from the heat roller becomes nonuniform at various portions of an image, possibly resulting in uneven development.

On the other hand, if the contact surface of the guide plate is made coarse to prevent the adherence of the heat-developable light-sensitive material, streaks may form on the image and the scoring of the emulsion surface will occur, deteriorating the quality of the finished image.

SUMMARY OF THE INVENTION

Accordingly, it is an object of the present invention to provide a heat development processor in which uneven development does not occur in a heat-developable light-sensitive material when the heat-developable light-sensitive material is subjected to heat development by a heat roller.

Another object of the present invention is to provide a heat development processor capable of preventing uneven development by reliably allowing steam released from a heat-developable light-sensitive material during heat development to escape outwardly from a nip between the light-sensitive material and a heat roller, without increasing the number of processing steps and prolonging the processing time, or enlarging the apparatus.

Still another object of the present invention is to provide a heat development processor capable of preventing uneven development and the scoring of an image surface while maintaining close contact between a heat-developable light-sensitive material and a heat roller during heat development.

To these ends, in accordance with one aspect of the invention, there is provided a heat development processor comprising: a heat roller whose peripheral surface is heated to a predetermined temperature, the heat roller being adapted to transport in close contact therewith a heat-developable light-sensitive material with a latent image formed thereon, so as to heat develop the heat-developable light-sensitive material; and a backup roller disposed in face-to-face relation with the heat roller at at least one of a vicinity of a position where the winding of the heat-developable light-sensitive material in close contact with the heat roller is started and a vicinity of a position where the winding of the heat-developable light-sensitive material in close contact with the heat roller ceases, a gap corresponding to or greater than the thickness of the heat-developable light-sensitive material being provided between the backup roller and the heat roller.

In a specific example of the present invention, the heat roller incorporates in an axial center thereof a halogen lamp serving as a heat source, and the peripheral portion of the heat roller is heated to the predetermined temperature by the halogen lamp. Preferably, the backup roller has a pair of collars provided respectively at both ends thereof, and the gap corresponding to or greater than the thickness of the heat-developable light-sensitive material being provided between the backup roller and the heat roller by means of steps formed by the collars. Since the apparatus of the present invention is arranged as described above, the gap is provided between the heat roller and the backup roller so that a nipping force does not act. Hence, steam can be squeezed out from between the heat-developable light-sensitive material and the peripheral portion of the heat roller, thereby preventing the occurrence of uneven development.

In accordance with another aspect of the present invention, there is provided a heat development processor comprising: a heat roller whose peripheral portion is heated to a predetermined temperature, the heat roller being adapted to transport in close contact therewith a heat-developable light-sensitive material with a latent image formed thereon, so as to heat develop the heat-developable light-sensitive material; and a plurality of backup roller for bringing the heat-developable light-sensitive material into close contact with the heat roller as the heat-developable light-sensitive material is fed into a nip between each of the backup rollers and the heat roller; and roller moving means for moving at least one of the plurality of backup rollers in a direction in which the at least one of the plurality of backup rollers is spaced apart from the heat roller while the heat-developable light-sensitive material is being transported.

In a specific example of the present invention, preferably, the backup rollers include a first backup roller for nipping the heat-developable light-sensitive material between the same and the heat roller and a second backup roller disposed on a downstream side, as viewed in a direction of travel of the light-sensitive material, of the first backup roller and adapted to nip the heat-developable light-sensitive material between the same and the heat roller and bring the heat-developable light-sensitive material into close contact with the peripheral portion of the heat roller in cooperation with the first backup roller, and the roller moving means is controlled such that after a leading end of the heat-developable light-sensitive material is nipped by the second backup roller and the heat roller, the first backup roller is moved in a direction in which the first backup roller is spaced apart from the heat roller. Since the apparatus of the present invention is arranged as described above, the steam released from the heat-developable light-sensitive material can be reliably discharged from between the heat-developable light-sensitive material and the heat roller, thereby preventing uneven development.

In accordance with still another aspect of the present invention, there is provided a heat development processor comprising: a heat roller whose peripheral surface is heated to a predetermined temperature, the heat roller being adapted to transport in close contact therewith a heat-developable light-sensitive material With a latent image formed thereon, so as to heat develop the heat-developable light-sensitive material; and a planar member for guiding a leading end of the heat-developable light-sensitive material onto the peripheral portion of the heat roller by coming into contact with the heat-developable light-sensitive material and for bringing the heat-developable light-sensitive material into close contact with the heat roller.

In a specific example of the present invention, the contact surface of the planar member with respect to the heat-developable light-sensitive material is preferably a hydrophobic and finely coarse surface. Since the apparatus of the present invention is arranged as described above, the adhesion of the heat-developable light-sensitive material onto the planar member and the scoring of the emulsion surface of the heat-developable light-sensitive material can be prevented.

In the heat development processor in accordance with one aspect of the present invention, a transporting force is imparted to the heat-developable light-sensitive material held in close contact with the peripheral portion of the heat roller over a predetermined length thereof between the heat roller and the backup rollers disposed around the heat roller, so as to transport the heat-developable light-sensitive material. As the heat-developable light-sensitive material is thus brought into close contact with the peripheral portion of the heat roller, the heat roller imparts heat to the heat-developable light-sensitive material.

In the present invention, a backup roller is disposed in face-to-face relation with the heat roller at one or both of a vicinity of a position where the winding of the heat-developable light-sensitive material in close contact with the heat roller is started and a vicinity of a position where the winding thereof ceases, and a gap is provided between the backup roller and the heat roller. By virtue of the presence of this gap, a nipping force does not act between the heat roller and the backup roller, so that steam evaporated from inside the heat-developable light-sensitive material heated by the heat roller can be squeezed out and discharged from between the heat-developable light-sensitive material and the peripheral portion of the heat roller.

For instance, backup rollers which rotate by the driving force of a driving means are disposed around the heat roller heated by a heat source disposed in an axial center thereof. Specifically, the backup rollers are disposed at the position where the winding of the heat-developable light-sensitive material in close contact with the heat roller is started and at the position where the winding thereof ceases. In the heat development processor in which the heat-developable light-sensitive material is nipped and transported by the backup rollers and the heat roller, a gap is provided between the heat roller and at least one of the backup rollers. As a result, the steam evaporated from the heat-developable light-sensitive material can be discharged through this gap.

Accordingly, uneven development, which is caused by the floating up of the heat-developable light-sensitive material when the evaporated steam stagnates between the heat roller surface and the heat-developable light-sensitive material, does not occur in the heat-developable light-sensitive material.

Thus, by providing a gap between the heat roller and at least one of the backup rollers, the steam is allowed to escape from between the heat-developable light-sensitive material and the heat roller, but the gap may be provided for both backup rollers. In this case, it suffices if the heat-developable light-sensitive material is brought into close contact with the peripheral portion of the heat roller by means of another backup roller or the like.

Here, the size of the gap which is provided between the backup roller and the heat roller is sufficient if it is substantially equal to or greater than the thickness of the heat-developable light-sensitive material. Specifically, the size of the gap is preferably equal to or slightly larger than the thickness of the heat-developable light-sensitive material. Namely, it suffices if the heat roller and the backup rollers are capable of reliably transporting the heat-developable light-sensitive material by imparting a transporting force to it, by taking into consideration an angle at which the heat-developable light-sensitive material is inserted into a space between the heat roller and the backup roller, the rigidity of the heat-developable light-sensitive material and the like.

In addition, if both axial ends of the backup roller are respectively provided with collars having a diameter greater than that of an intermediate portion of the backup roller so that a gap will be formed between the intermediate portion of the backup roller and the peripheral portion of the heat roller, and if the collars are made to abut against the peripheral portion of the heat roller, a fixed gap can always be formed between the backup roller and the heat roller. Then, it suffices if the heat-developable light-sensitive material is inserted through this gap, and is wound around the heat roller in close contact therewith.

Meanwhile, in the event that a portion of the heat-developable light-sensitive material floats up from the heat roller owing to the stagnation of steam below the portion of the heat-developable light-sensitive material with the heat-developable light-sensitive material wound around the heat roller, there are cases where creases appear in the finished heat-developable light-sensitive material. In the present invention, however, it is possible to prevent the stagnation of steam between the heat-developable light-sensitive material and the heat roller, and to prevent the creases from being formed in the heat-developable light-sensitive material.

In accordance with another aspect of the present invention, the heat-developable light-sensitive material is nipped by the heat roller and a plurality of backup rollers, and is transported in close contact with the heat roller. Midway during the transport of the heat-developable light-sensitive material, at least one of the backup rollers is moved away from the heat roller.

For example, in a case where a large nipping force is required as when the leading end of the heat-developable light-sensitive material is transported in conjunction with the rotation of the heat roller in close contact with the heat roller, this necessary nipping force is secured. Meanwhile, in a case where steam or a gas is released from the heat-developable light-sensitive material between the heat-developable light-sensitive material and the heat roller and bubbles are formed, the backup roller is moved away from the heat roller to eliminate the nipping force, thereby making it possible to discharge the steam or gas to the outside from between the heat-developable light-sensitive material and the heat roller.

As a result, the process for preliminarily removing water contained in the heat-developable light-sensitive material becomes unnecessary, and troublesome adjustment is not required for setting the nipping force.

As a result, in heat development processing, the steam or gas released from the heat-developable light-sensitive material can be reliably discharged to the outside from between the heat-developable light-sensitive material and the heat roller and uneven development can be prevented without entailing an increase in the number of processing steps involved or making the apparatus large in size.

In addition, in accordance with another arrangement, the first backup roller is disposed on the upstream side in the direction of travel of the heat-developable light-sensitive material; the second backup roller is disposed on the downstream side in the direction of travel of the heat-developable light-sensitive material; and after the leading end of the heat-developable light-sensitive material is nipped by the second backup roller and the heat roller, the first backup roller is moved in the direction in which the peripheral portion of the first backup roller is spaced apart from the peripheral portion of the heat roller.

For this reason, after the leading end of the heat-developable light-sensitive material is nipped by the second backup roller and the heat roller, a nipping force necessary for transporting the heat-developable light-sensitive material is sufficiently secured by the second backup roller without resorting to the nipping force of the first backup roller.

Since the nipping force of the first backup roller ceases to act by moving the first backup roller away from the peripheral portion of the heat roller, the steam produced between the heat-developable light-sensitive material and the heat roller is squeezed out from the leading end to the trailing end of the heat-developable light-sensitive material and escapes from the trailing end of the heat-developable light-sensitive material to the outside, and its escape is made more reliable.

In accordance with still another aspect of the present invention, since the contact surface of the planar member with respect to the heat-developable light-sensitive material is formed into a finely coarse surface, the occurrence of sticking or repetition of adhesion and release (stick-slip) does not occur, and it is possible to prevent the occurrence of scoring or uneven development.

In accordance with another arrangement, since the planar member is hydrophobic, the threading characteristic for threading the heat-developable light-sensitive material improves. To secure this hydrophobic property, it is preferable to provide the planar member with a Teflon coating.

In accordance with still another arrangement, the finely coarse surface is defined by the average coarseness Ra (μm) in the JIS (Japanese Industrial Standards), the sliding characteristic of the contact surface of the planar member with respect to the heat-developable light-sensitive material is thus excellent to prevent the occurrence of scoring. Such a finely coarse surface can be formed by making the surface of a plastic film such as PET coarse by using sand paper.

In accordance with a further arrangement, the finely coarse surface is formed of a fabric, and the fabric is woven with a density of 15 threads/cm or more as warp threads and weft threads, respectively. Hence, the occurrence of scoring of the emulsion surface of the heat-developable light-sensitive material can be prevented.

Other objects, features and advantages of the invention will become more apparent from the following detailed description of the invention when read in conjunction with the accompanying drawings.

DESCRIPTION OF THE PREFERRED EMBODIMENTS

Figure 1:
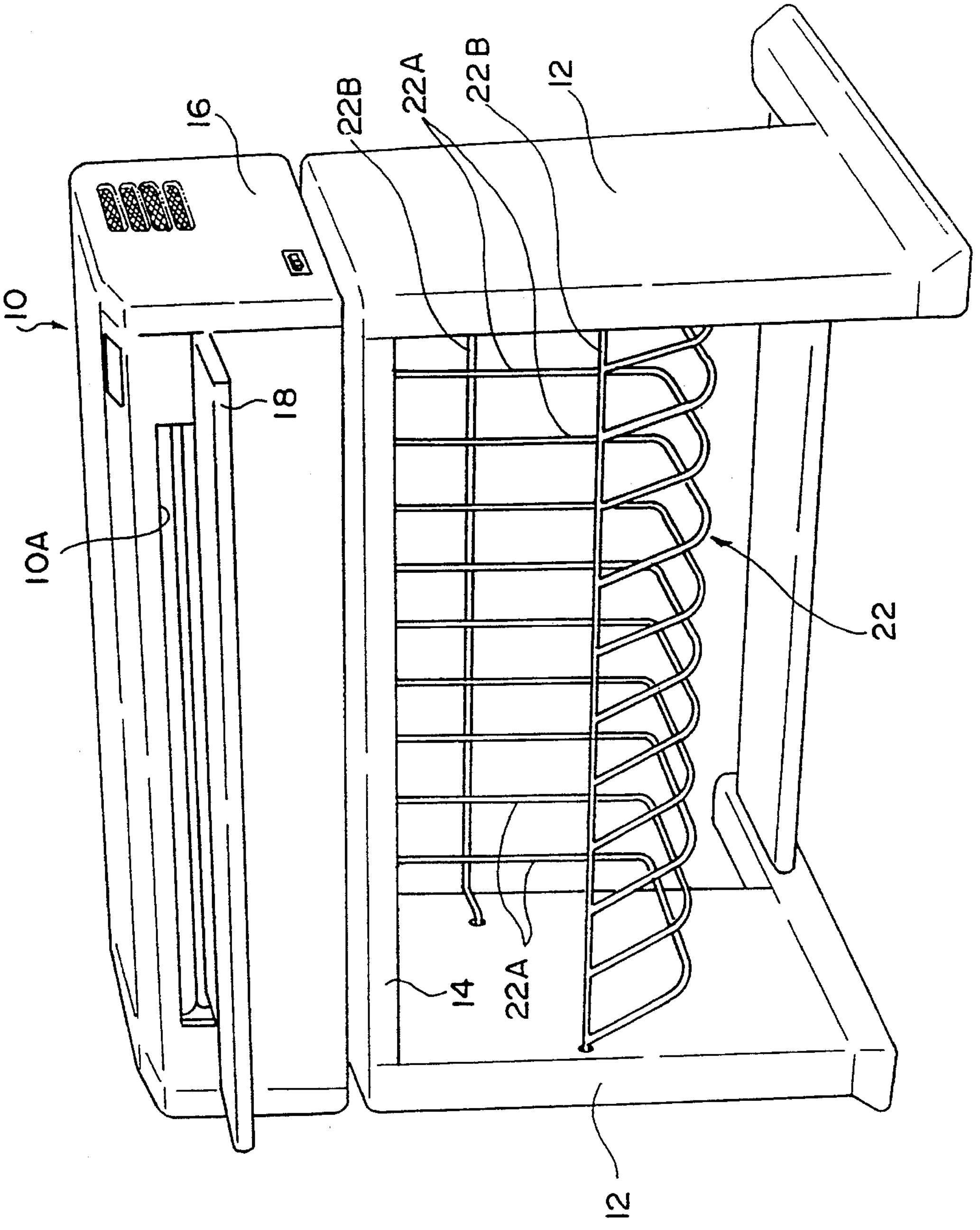
FIG. 1 is a schematic diagram of a heat development processor in accordance with a first embodiment of the present invention.

A heat development processor in accordance with a first embodiment of the present invention is shown in FIG. 1. It should be noted that this heat development processor is applied to a color proof making apparatus.

A color proof making apparatus is an apparatus for making a color proof which is used for checking errors in the layout, color, characters, and the like of original films before actual printing is effected by using the original films color-separated into a yellow (Y) plate, a magenta (M) plate, a cyan (C) plate, and a black (BK) plate. To obtain a color proof, each of the original films is positioned and superposed one at a time on the color proof making apparatus, and a heat-developable light-sensitive material is consecutively subjected to contact exposure by means of, for instance, ultraviolet rays to effect multiple contact exposure. After a latent image is thus formed on the heat-developable light-sensitive material, the heat-developable light-sensitive material is subjected to heat development by a heat development processor to render the latent image visible, thereby obtaining a color proof.

As shown in FIG. 1, a heat development apparatus 10 which is a heat development processor is mounted on a support base 14 stretching between upper ends of a pair of legs 12. The heat development apparatus 10 is covered with a casing 16, and an inserting table 18 is attached on a side surface of the casing 16 which is provided with a light-sensitive-material inserting port 10A. A light-sensitive material 20 (see FIG. 2), which is a heat-developable light-sensitive material and for which exposure has been completed, is placed on this inserting table 18 and is fed into the heat development apparatus 10.

A tray 22 is provided between the pair of legs 12. This tray 22 is formed by a plurality of mutually parallel rod-like frame members 22A. These frame members 22A extend downward, and their extended distal ends are bent substantially in a U-shape.

Support bars 22B are respectively attached to axially intermediate positions and bent distal positions of the frame members 22A. The frame members 22A are supported by the inner sides of the legs 12 via these support bars 22B. For this reason, the light-sensitive material 20 discharged through a light-sensitive-material discharging port 10B (see FIG. 2) provided in a lower portion of the heat development apparatus is guided to a position below the light-sensitive-material inserting port 10A (to a position below the heat development apparatus 10 on the front side thereof) by the frame members 22A, so as to be accommodated in the tray 22.

Figure 2:
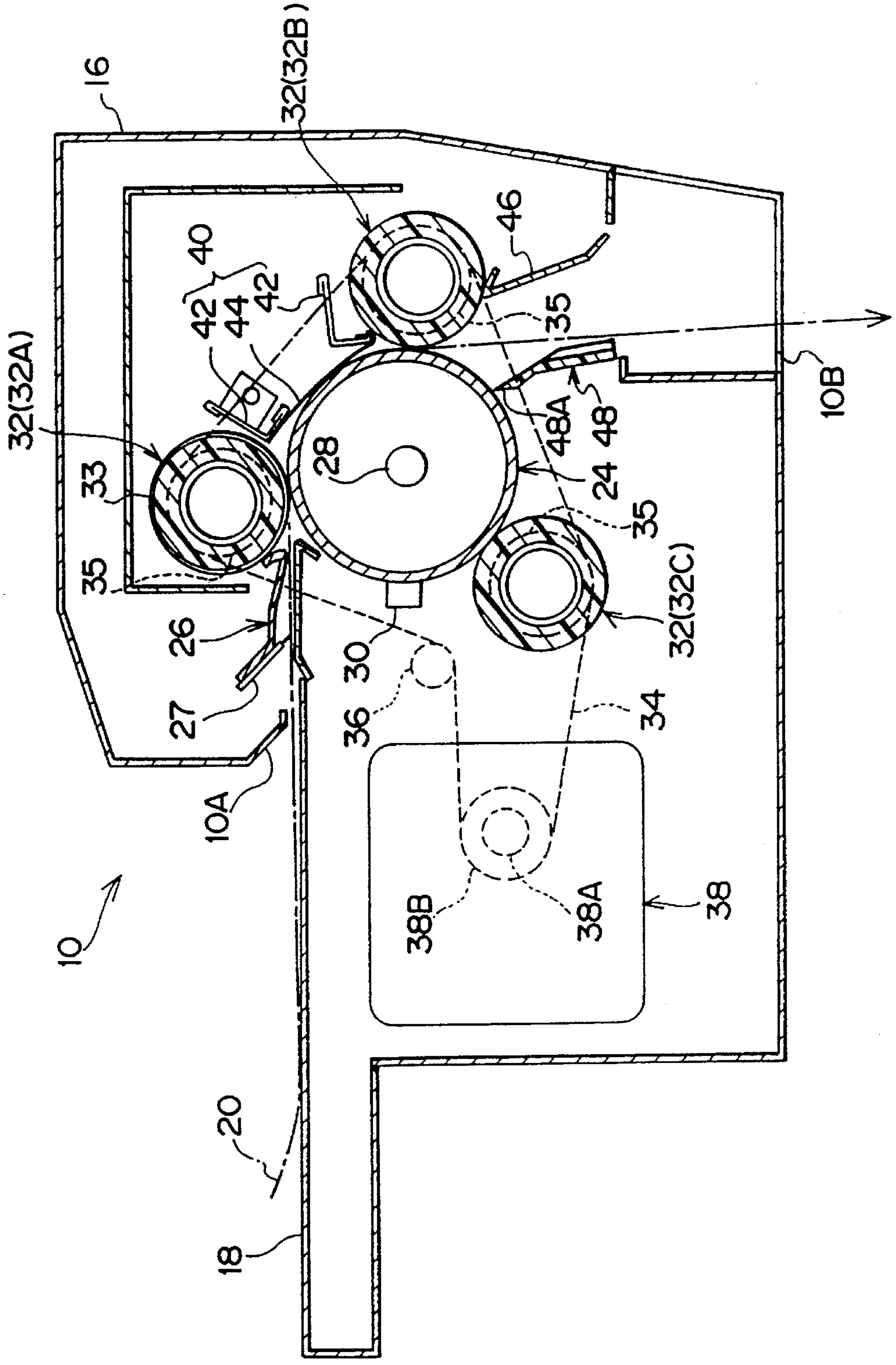
FIG. 2 is a side elevational view illustrating an internal structure of the heat development processor in accordance with the first embodiment.

As shown in FIG. 2, on the downstream side of the inserting table 18 in the direction of travel of the light-sensitive material, a guide plate 26 for guiding the light-sensitive material 20 is disposed between the light-sensitive-material inserting port 10A and a heat roller 24 provided inside the heat development apparatus 10. For this reason, as the operator pushes the light-sensitive material 20 placed on the inserting table 18 with its emulsion surface facing upward, a leading end of the light-sensitive material 20 is reliably guided onto the peripheral surface of the heat roller 24.

In addition, a destaticizing brush 27 is attached to an upstream end, as viewed in the direction of travel of the light-sensitive material 20, of this guide plate 26. As its bristles come into contact with the light-sensitive material 20 being inserted, this destaticizing brush 27 serves to eliminate static electricity with which the light-sensitive material 20 is charged. The heat roller 24 has a cylindrical member formed of aluminum, and its peripheral surface is provided with alumite treatment. It should be noted that this heat roller 24 is not axially supported by the casing 16.

A halogen lamp 28 serving as a heat source is provided in the axial center of the heat roller 24, and the peripheral surface of the heat roller 24 is heated by the heat from this halogen lamp 28. A thermistor 30 is in contact with a portion of the peripheral surface of the heat roller 24 so as to detect the temperature of the peripheral surface of the heat roller 24. For this reason, by controlling the turning on and off of the halogen lap 28 by feeding back the temperature detected by the thermistor 30, the temperature of the peripheral surface of the heat roller 24 can be maintained at a predetermined temperature. It should be noted that, in this embodiment, the temperature of the peripheral surface of the heat roller 24 is controlled to 125° C. to 130° C.

Backup rollers 32 axially supported by the casing 16 are arranged at a plurality of (three in this embodiment) positions surrounding the heat roller 24. These backup rollers 32 are formed by coating an outer periphery of an aluminum pipe with silicon foam. To support the heat roller 24 rotatably, these backup rollers 32 are arranged in contact with the peripheral surface of the heat roller 24 at substantially equal intervals around the heat roller 24 (i.e., the backup rollers 32 are arranged at intervals of about 120° using the axis of the heat roller 24 as a reference).

In other words, these three backup rollers 32 serve to support the heat roller 24 and impart a rotatively driving force to the heat roller 24.

Figure 3:
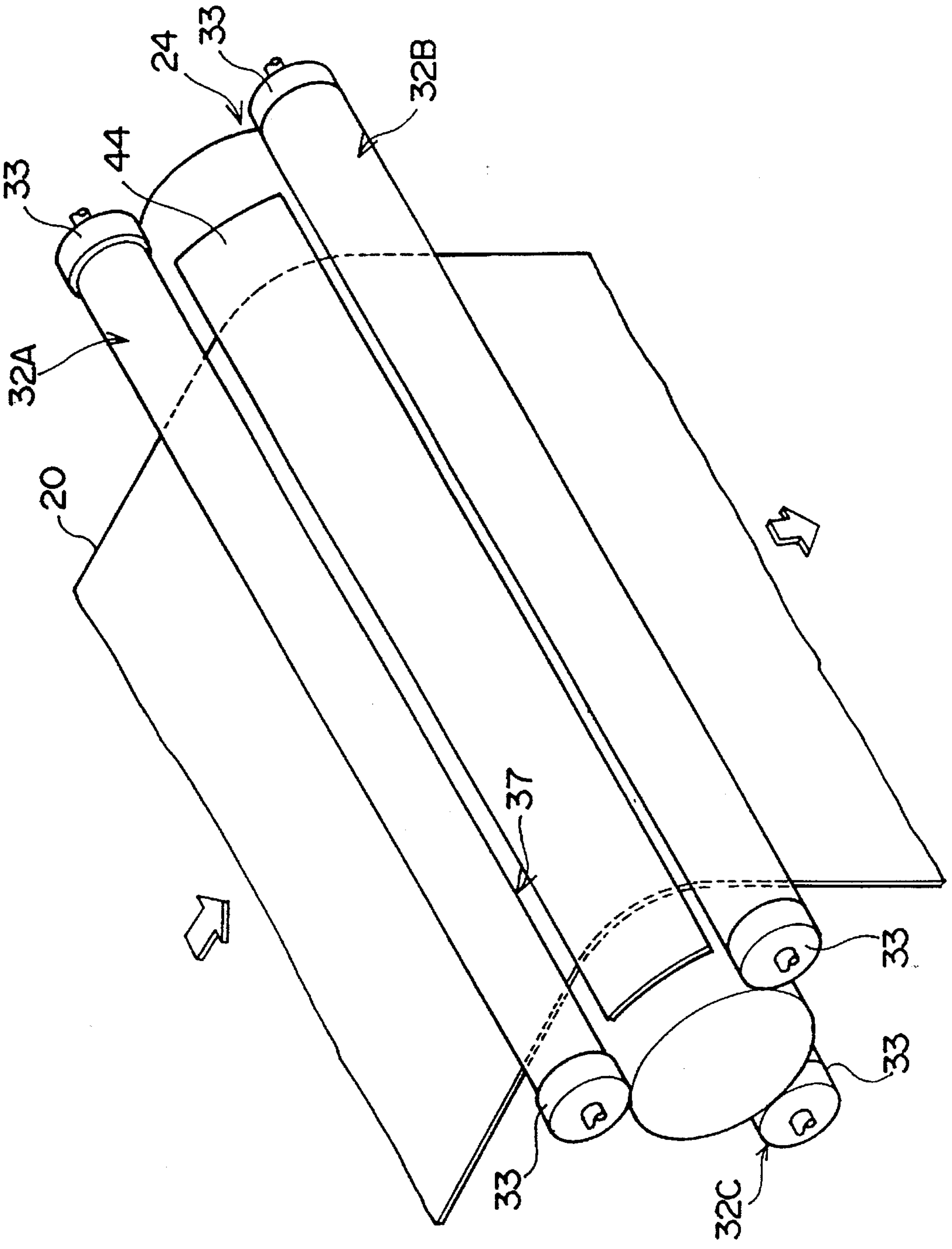
FIG. 3 is a perspective view illustrating the state of arrangement of a heat roller and backup rollers in accordance with the first embodiment.
Figure 4:
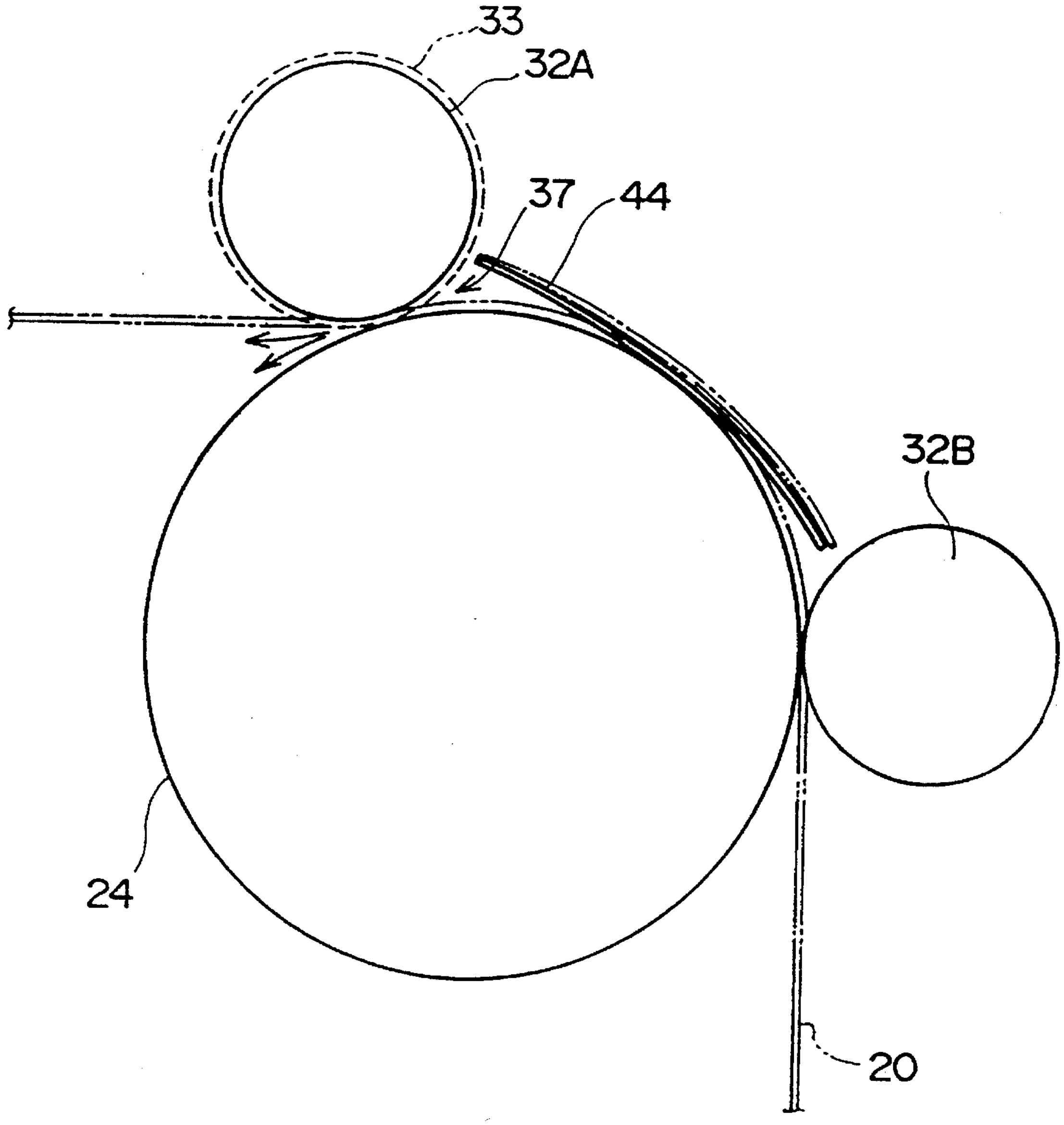
FIG. 4 is an enlarged view of the heat roller, the backup rollers, and their vicinity in accordance with the first embodiment.

As shown in FIGS. 3 and 4, collars 33 secured to rotatively driving shafts of the backup rollers 32 are respectively attached to both axial ends of the backup rollers 32. The outer surface of the collar 33 of the backup roller 32, which first receives the light-sensitive material 20 inserted through the light-sensitive-material inserting port 10A, has a difference in diameter, i.e., a step, with respect to the roller surface, the difference being substantially equal to the thickness of the light-sensitive material 20. However, there is no difference in diameter between the roller surface and the outer surface of the collar 33 of each of the other two backup rollers. The outer surfaces of their collars 33 are flush with the roller surface. These collars 33 are respectively in contact with the peripheral surface of the heat roller 24.

A sprocket 35 (see FIG. 2) is attached to an axial end of each of the backup rollers 32, and an endless chain 34 is wound around the sprockets 35. This endless chain 34 is also wound around an idle pulley 36 and a sprocket 38B attached to a drive shaft 38A of a drive motor 38.

For this reason, if the drive motor 38 is driven, the backup rollers 32 rotate counterclockwise in FIG. 2, causing the heat roller 24 to be rotated clockwise in FIG. 2. It should be noted that the traveling speed of the light-sensitive material 20 based on the rotation of the backup rollers 32 is 10 to 100 mm/sec.

Here, the backup roller 32 which first receives the light-sensitive material 20 (hereafter this backup roller will be referred to as a first roller 32A) is disposed above the heat roller 24 and in the vicinity of the guide plate 26. As described above, the outer surface of each of the collars 33 of this first roller 32A forms a step with respect to the roller surface, the height of the step being substantially equal to the thickness of the light-sensitive material 20.

The light-sensitive material 20 pushed in by being guided by the guide plate 26 enters a space surrounded by the peripheral surface of the first roller 32A, by the collars 33 at both ends of the first roller 32A, and by the peripheral surface of the heat roller 24. When the drive motor 38 is rotatively driven in this state, the light-sensitive material 20 is transported by the heat roller 24 and the first roller 32A. Further, the light-sensitive material 20 is pressed against the peripheral surface of the heat roller 24 by means of the backup roller 32 (hereafter referred to as a second roller 32B) disposed at a position offset 120° clockwise with respect to the first roller 32A and a guide plate 44 which will be described later, and the light-sensitive material 20 is transported by being wound around the peripheral surface of the heat roller 24.

It should be noted that the second roller 32B, together with the backup roller 32 (hereafter referred to as a third roller 32C) being in contact with a lower portion of the heat roller 24, abuts against the heat roller 24 over the entire axial direction thereof, i.e., the longitudinal direction of these backup rollers. The second roller 32B reliably nips the light-sensitive material 20 between the same and the heat roller 24. As described above, the rotatively driving force is reliably transmitted to the heat roller 24 by its contact with the first roller 32A, the second roller 32B, and the third roller 32C.

A turn guide section 40 is provided above the heat roller 24 at a position where the light-sensitive material 20 begins to be brought into contact with the heat roller 24. This turn guide section 40 is comprised of a pair of L-brackets 42 and a guide plate 44 stretched between the pair of L-brackets 42. The guide plate 44 is urged in such a manner as to be brought into contact with the peripheral surface of the heat roller 24 by means of the resiliency of the guide plate 44 itself and the L-brackets 42. As a result, the light-sensitive material 20 is pressed against the heat roller 24, and is transported in a state of close contact with the peripheral surface of the heat roller 24, beginning with the leading end of the light-sensitive material 20.

For this reason, the light-sensitive material 20 is heated sufficiently on the downstream side, as viewed in the direction of travel, of the turn guide section 40, and heat development is promoted.

Here, since the guide plate 44 is brought into direct contact with the emulsion surface (a highly hydrophilic soft light-sensitive layer) of the light-sensitive material 20, if the material constituting the guide plate 44 is hydrophobic, the adhesion and stick-slip (a phenomenon in which adhesion and release are repeated) of the light-sensitive material 20 do not occur, making smooth transport possible. In addition, by selecting a material having a surface of appropriate coarseness, the scoring of the emulsion surface of the light-sensitive material 20 is prevented.

As the guide plate 44 in this embodiment, an arrangement is adopted in which fine fibers, such as a glass fabric, provided with Teflon coating are attached to a flexible support. This Teflon-coated glass fabric has a regular uneven surface, and since it is hydrophobic because of its Teflon coating, its threading characteristic for threading the light-sensitive material 20 improves. As a result, since the guide plate 44 is formed of fine fibers, the scoring of the emulsion surface of the light-sensitive material 20 is prevented.

As a material which can be used as the guide plate 44 in addition to the above, it was found that polyethylene terephthalate (PET) whose surface has a center-line average coarseness Ra (μm) of 0.5 to 5 (preferably, 1.0 to 4.0) according to a JIS standard, such as PET coarsened with #150 or #400 sand paper, or aramid-fiber felt, an aramid-fiber fabric, and the like can be used.

The usable range of the surface coarseness of PET was determined for the following reason.

Unprocessed PET had Ra of 0.06 μm or less. Therefore, when its surface was coarsened with #100, #150, and #400 sand paper, Ra for #100 was 5.17, Ra for #150 was 3.28, and Ra for #400 was 1.34. When the threading characteristic and the appearance of scores were observed by using these guide plates 44, it was found that PET coarsened with #150 and #400 sand paper is usable.

From this result, it is considered that PET with an average coarseness Ra (μm) of 0.5 to 5 (preferably, 1.0 to 4.0) according to the JIS standard, such as PET coarsened with #150 or #400 sand paper, is usable.

In addition, if a fabric is used for the guide plate 44 in this embodiment, there are numerous requirements including not only the material of the fibers but also the size of the fiber, the size of yarn, the method of weaving, and the density of yarn. However, a fabric having 15 threads/cm or more as the warp and the weft, respectively, is usable.

As shown in FIGS. 3 and 4, in the first roller 32A, the roller diameter of its portion between the collars 33, i.e., its portion facing the light-sensitive material 20, is smaller than the diameter of the collar 33, so that a gap 37 is formed between that portion and the peripheral surface of the heat roller 24. The dimension of this gap 37 is set to be a value which is substantially equal to or slightly larger than the thickness of the light-sensitive material 20 used.

In this embodiment, a light-sensitive material in which the thickness of a base is 135 μm and the thickness of the emulsion layer is 25 to 35 μm (a total of 160 to 170 μm) is used. For this reason, the dimension of the aforementioned gap is 0.17 to 0.18 mm or thereabouts. That is, the arrangement provided is such that this gap 37 prevents a nipping force to be imparted to the light-sensitive material 20 which enters between the first roller 32A and the heat roller 24.

When heat development is effected, water contained in the light-sensitive material 20 evaporates, and is released in the form of steam. Since this steam is produced between the heat roller 24 and the light-sensitive material 20, there are cases where the light-sensitive material 20 floats (separated from the heat roller 24) by the pressure of the steam. In this embodiment, however, the first roller 32A and the heat roller 24 are held in a non-nipping state by means of the collars 33, steam is discharged through this non-nipping portion, thereby preventing the floating of the light-sensitive material 20 due to the pressure of the steam.

As shown in FIG. 2, the second roller 32B is located substantially horizontally adjacent to the heat roller 24, and a tangential line passing through a point of mutual contact is set in the range of ±30° or thereabouts with respect to a vertical line.

Accordingly, the light-sensitive material 20 which is transported while being nipped by the second roller 32B and the heat roller 24 is released from the heat roller 24 and the second roller 32B by its own weight on the downstream side of the second roller 32B, and is fed in a vertically downward direction (in the direction of gravity) by the rotation of the heat roller 24.

On the downstream side of the second roller 32B, guide plates 46 and 48 are disposed in correspondence with the obverse and reverse surfaces of the light-sensitive material 20, respectively. An upper end of the guide plate 46 on the emulsion surface side of the light-sensitive material 20, i.e., on the right-hand side in FIG. 2, is bent substantially in a U-shape, and this bent portion is disposed in proximity to the second roller 32B In addition, a lower end of this guide plate 46 in FIG. 2 extends toward the light-sensitive-material discharging port 10B.

Meanwhile, an upper end of the guide plate 48 on the left-hand side in FIG. 2 is formed with a gradually reduced thickness, and its tip is brought to the peripheral surface of the heat roller 24, and serves as a scraper (hereafter this tip will be referred to as a scraper portion 48A).

In general, the light-sensitive material 20 is released from the heat roller 24 and the second roller 32B in a state in which a curl due to heat development and a curl due to winding are mutually offset, i.e., in a state in which the light-sensitive material 20 maintains its flatness (the light-sensitive material 20 is released in the direction of the tangential line passing through a point of contact between the heat roller 24 and the second roller 32B). However, if adhesion to the heat roller 24 is strong, there are cases where the light-sensitive material 20 is transported in a state in which it adheres to the heat roller 24 even after passing the second roller 32B. In such a case, the scraper portion 48A at the tip of the guide plate 48 releases the leading end of the light-sensitive material 20 from the heat roller 24, thereby reliably feeding the light-sensitive material 20 to the light-sensitive-material discharging port 10B.

It should be noted that since the light-sensitive material 20 passing between the guide plates 46 and 48 is transported in the range of ±30° or thereabouts with respect to a vertical line serving as a reference, the light-sensitive material 20 seldom comes into contact with the guide plates 46 and 48. For this reason, the light-sensitive material 20 reaches the light-sensitive-material discharging port 10B without being cooled suddenly. Meanwhile, during the time when the light-sensitive material 20 reaches the light-sensitive-material discharging port 10B, the light-sensitive material 20 is cooled gradually, and development is stable at a point of time when the light-sensitive material 20 is discharged through the light-sensitive-material discharging port 10B.

The heat-developed light-sensitive material 20 is discharged through the light-sensitive-material discharging port 10B, and is accommodated in the tray 22 (shown in FIG. 1) disposed below the light-sensitive-material discharging port 10B.

Hereafter, a description will be given of the operation of this embodiment.

When the exposed light-sensitive material 20 is placed on the inserting table 18 by the operator, and is inserted into the light-sensitive-material inserting port 10A, the light-sensitive material 20 is guided by the guide plate 26, and is brought into contact with a peripheral surface of the heat roller 24 at a position higher than the axis of the heat roller 24. Since the first roller 32A is disposed at this position, the light-sensitive material 20 is inserted into a small gap (gap 37) between the first roller 32A and the heat roller 24. Since this gap 37 has a dimension corresponding to the thickness of the light-sensitive material 20, the gap 37 does not have a nipping force, but a transporting force is imparted to the light-sensitive material 20. For this reason, the leading end of the light-sensitive material 20 is guided by the guide plate 44, is thereby brought into close contact with the peripheral surface of the heat roller 24, and is transported in close contact therewith over approximately an upper one third of the circumference of the heat roller 24 as the heat roller 24 rotates.

The light-sensitive material 20 is pressed and urged toward the heat roller 24 by the guide plate 44 of the turn guide section 40, and is further pressed toward the heat roller 24 by the second roller 32B, so that heat from the heat roller 24 is reliably transmitted to the light-sensitive material 20 to effect heat development.

Here, since the light-sensitive material 20 contains water to a certain degree, this water evaporates during heat development and is released between the heat roller 24 and the light-sensitive material 20 in the form of steam. As the steam is thus released, increased pressure between the light-sensitive material 20 and the heat roller 24 has conventionally caused the light-sensitive material 20 to float from the heat roller 24 against the pressing force of the guide plate 44, possibly resulting in unevenness in heat development.

In this embodiment, however, since the gap 37 is provided between the heat roller 24 and the first roller 32A, and a nipping force is not provided at that position, the steam is allowed to escape through this gap 37. As a result, the pressure between the light-sensitive material 20 and the heat roller 24 does not increase, so that the light-sensitive material 20 can be reliably transported in contact with the peripheral surface of the heat roller 24.

Since the guide plate 44 of the turn guide section 40 comes into direct contact with the emulsion surface of the light-sensitive material 20 wound around the heat roller 24, at least its contact surface is made hydrophobic to prevent the adhesion of the light-sensitive material 20, and it is preferable to select a material having a surface with appropriate coarseness which will not score the emulsion surface.

As the guide plate 44 in this embodiment, a material is used in which a Teflon-coated glass fabric is attached to a flexible support. Accordingly, the threading characteristic for threading the light-sensitive material 20 improves, and since it employs fine fibers, the scoring of the emulsion surface is prevented.

Table 1 below shows the results of determining the usability of respective materials which are usable as the guide plate 44, including, in addition to the aforementioned material Teflon-coated on the glass fabric (material A in Table 1), PET with its surface coarsened with #400 sand paper (material B in Table 1), aramid-fiber felt (material C in Table 1), and an aramid-fiber fabric (material D in Table 1), as well as PET used as a conventional guide plate (material E in Table 1).

TABLE 1

| Material | Nonadhesion (threading characteristic) | Stick-slip | Roughing of emulsion surface | Development quality |
|---|---|---|---|---|
| A | ⊙ | ○ | Δ | ○ |
| B | ○ | ○ | Δ | ○ |
| C | ○ | Δ | ⊙ | ○ |
| D | Δ | x | x x | ○ |
| E | x x | x | ○ | x |

[Material]

Material A: Teflon-coated glass fabric (used in this embodiment, and plain woven with 15 threads/cm as the warp and the weft, respectively, using a thread made of 150 filaments of 2 denier)

Material B: PET base coarsened with #400 sand paper

Material C: aramid-fiber felt

Material D: aramid-fiber fabric (plain woven into a density of 12.8 warp threads/cm using a thread made of 500 filaments of 2 denier)

Material E: PET base (conventional material)

[Legends for evaluation]

⊙: very good, ○: good, Δ: fair (no problem)

×: has a slight problem × ×: unusable

As can be seen from Table 1, the materials A to C are utterly nonadhesive, and that the-scoring of the emulsion surface is negligible. In the material D as well, there is no problem in the nonadhesiveness of the light-sensitive material 20, but there are problems in other aspects of usability (stick-slip, roughing of the emulsion surface). With respect to the material E, since the surface is flat, there is no roughing of the emulsion surface, but it can be seen that this material is inferior in other aspects of usability.

The direction of travel of the light-sensitive material 20 which has passed the turn guide section 40 is vertically downward at the position where the light-sensitive material 20 passes the second roller 32B. As for the light-sensitive material 20 located between the heat roller 24 and the second roller 32B, a curl due to-heat (a curl with the emulsion surface on its inward side) and a curl due to winding around the heat roller 24 (a curl with the emulsion surface on its outward side) offset each other. Accordingly, since the light-sensitive material 20 is in a state in which its flatness is maintained, the light-sensitive material 20 is normally fed as it is in a vertically downward direction.

The temperature of the light-sensitive material 20 located between the guide plates 46 and 48 is relatively high since it has just been released from the heat roller. For this reason, if the light-sensitive material 20 comes into contact with a surrounding member having a relatively low temperature, the light-sensitive material 20 is suddenly cooled, possibly resulting in nonuniform shrinking of the base of the light-sensitive material 20 and uneven development.

In this embodiment, however, the light-sensitive material 20 which has passed between the second roller 32B and the heat roller 24 is released from them by its own weight, and the direction of its subsequent travel is in a substantially vertical direction. For this reason, even if the light-sensitive material 20 comes into contact with the guide plates 46 and 48, the period of its contact is short and its contact area is small, so that the light-sensitive material 20 is not cooled suddenly. Accordingly, the light-sensitive material 20 is cooled gradually while passing between the guide plates 46 and 48, thereby making it possible to prevent the occurrence of the nonuniform shrinking of the base and uneven development.

The light-sensitive material 20 which has passed through the light-sensitive-material discharging port 10B is discharged into the tray 22. Since the light-sensitive material 20 at this time has already been cooled, the nonuniform shrinking of the base and uneven development do not occur by contact with the tray 22.

Figure 5A:
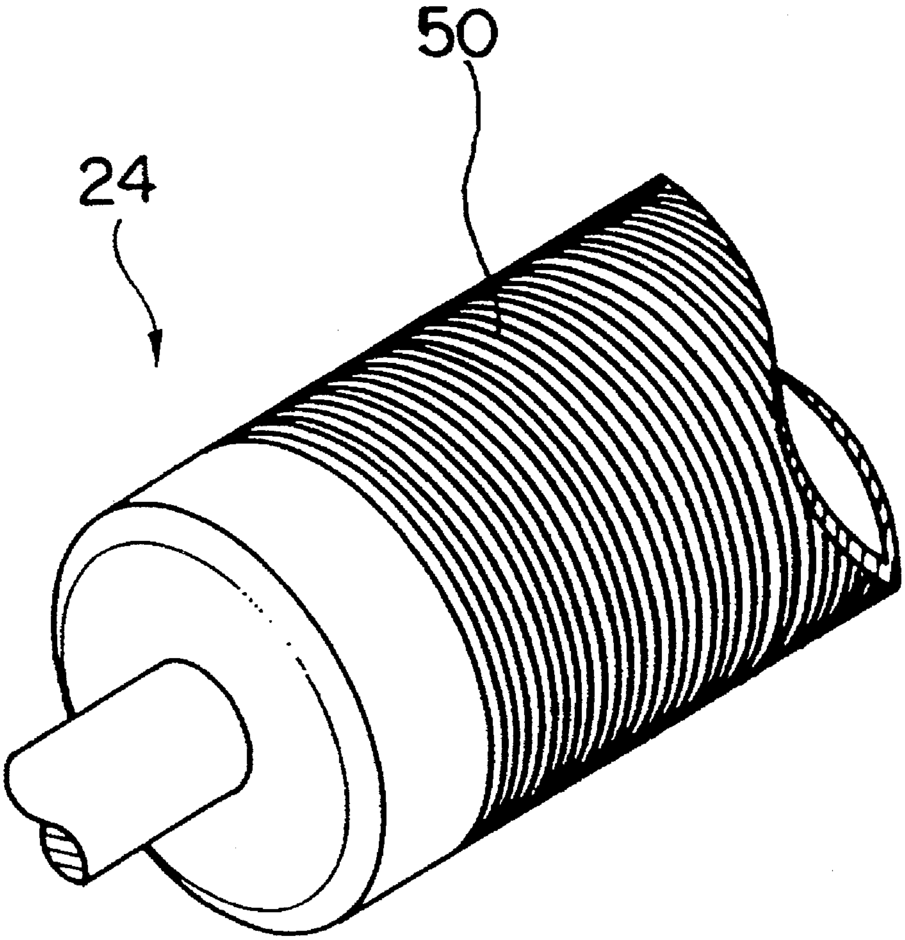
FIG. 5A is a perspective view of the heat roller in which grooves are formed in its peripheral surface.

Although a heat roller having a flat peripheral surface is used as the heat roller 24 in this embodiment, circumferential grooves 50 may be formed in the peripheral surface of the heat roller 24, as shown in FIG. 5A. Namely, the peripheral surface is intentionally made coarse by the provision of the grooves 50. Instead of providing the plurality of grooves arranged in parallel in the axial direction of the heat roller 24 as shown in FIG. 5A, a helical groove may be formed from one axial end to the other.

Due to these grooves 50, when the light-sensitive material 20 is brought into contact with the peripheral surface of the heat roller 24, the light-sensitive material 20 is supported by ridge portions formed between the grooves. For this reason, steam which is produced from the light-sensitive material 20 can be discharged more efficiently from the gap 37 between the first roller 32A and the heat roller 24.

Figure 5B:
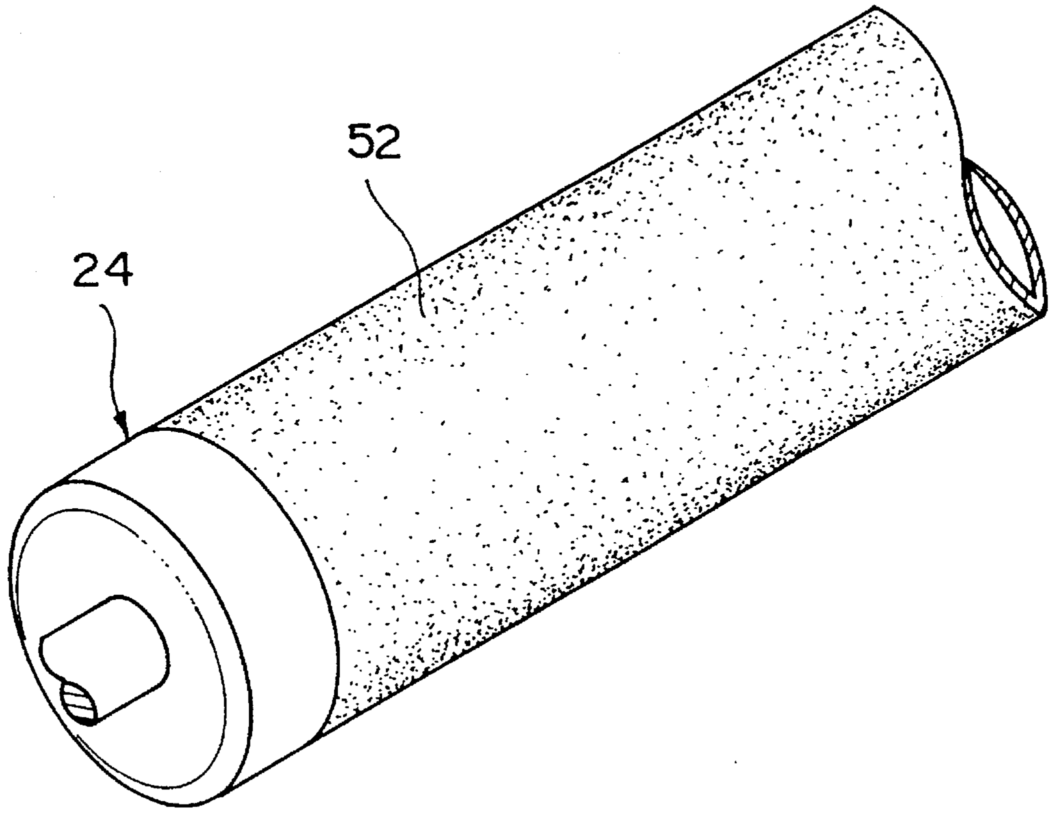
FIG. 5B is a perspective view of the heat roller whose surface is provided with matte finish to form an uneven surface potion.
Figure 6:
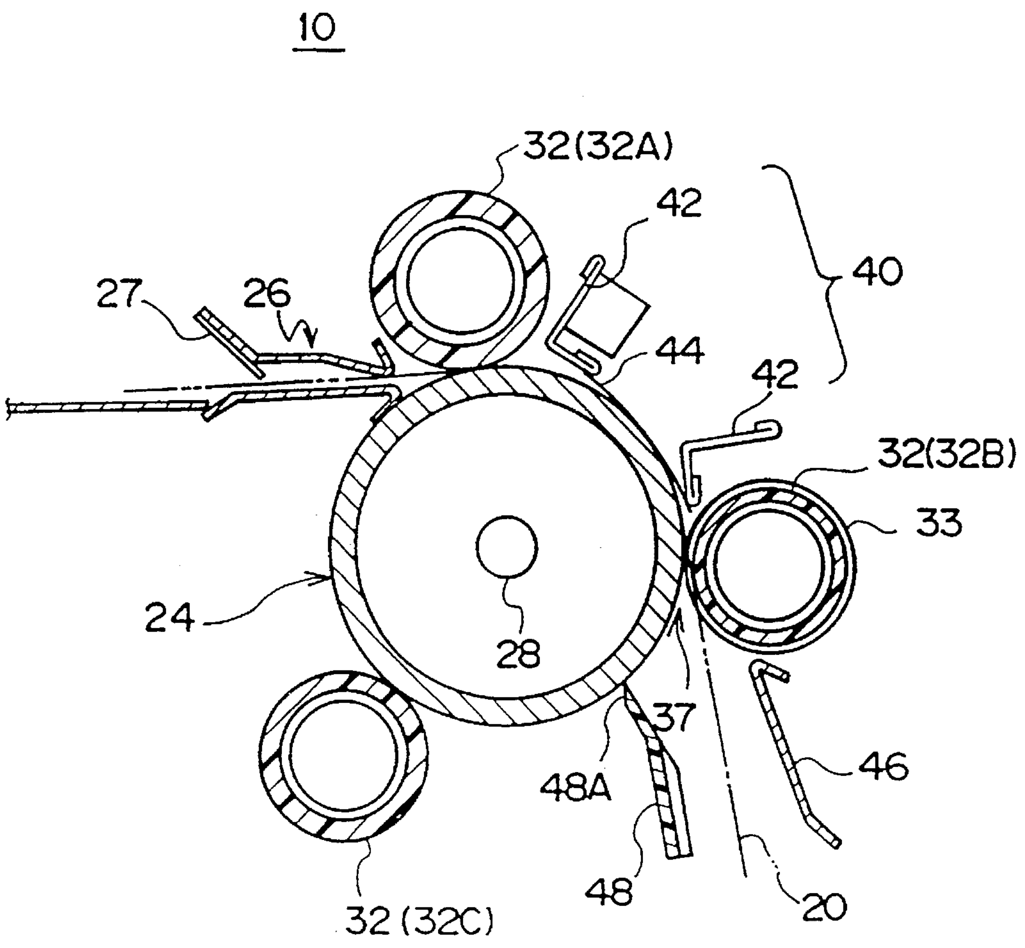
FIG. 6 is a schematic diagram of the heat roller, the backup rollers, and their vicinity in accordance with a modification of the first embodiment.

Thus, in the example shown in FIG. 5A, the grooves 50 are formed in the peripheral surface of the heat roller 24 so as to intentionally make the peripheral surface coarse, thereby providing escape for the steam. Alternatively, a matte finish may be provided on the peripheral surface of the heat roller 24, as shown in FIG. 5B. Since an uneven surface portion 52 is formed on the peripheral surface of the heat roller 24 by this matte finish, the light-sensitive material 20 is transported while being supported on projections formed on the uneven surface portion 52. Hence, even if steam is released from the light-sensitive material 20, the steam can be discharged through recesses formed in the uneven surface portion 52.

Although, in this embodiment, the Teflon-coated glass fiber fabric is used as the guide plate 44, it is possible to use the materials B to C shown in Table 1. In this case, in a case where a regular uneven surface is formed as in a fabric, it is necessary for the pitch to be 3 mm or less. Also, in addition to the materials shown in Table 1, irregular craping may be provided. Furthermore, the guide plate 44 having a flat surface may be provided with embossing to form a fine uneven surface.

Although, in this embodiment, the gap 37 is formed between the peripheral surface of the heat roller 24 and the first roller 32A, which is the backup roller 32 disposed in the vicinity of a position where the winding of the light-sensitive material 20 around the heat roller 24 is started, the first roller 32A may be held in close contact with the peripheral surface of the heat roller 24, and the gap 37 may be formed between the second roller 32B and the peripheral surface of the heat roller 24.

As a result, when the light-sensitive material 20 inserted into the heat development apparatus 10 is fed into a nip between the first roller 32A and the heat roller 24, the light-sensitive material 20 is nipped and transported by the first roller 32A and the heat roller 32B, guided by the guide plate 44, and fed into the gap 37 between the second roller 32B and the peripheral surface of the heat roller 24. At this time, the steam evaporated from the light-sensitive material 20 heated by the heat roller 24 is released from the gap 37 between the second roller 32B and the heat roller 24 which do not impart a nipping force to the light-sensitive material 20.

Figure 7:
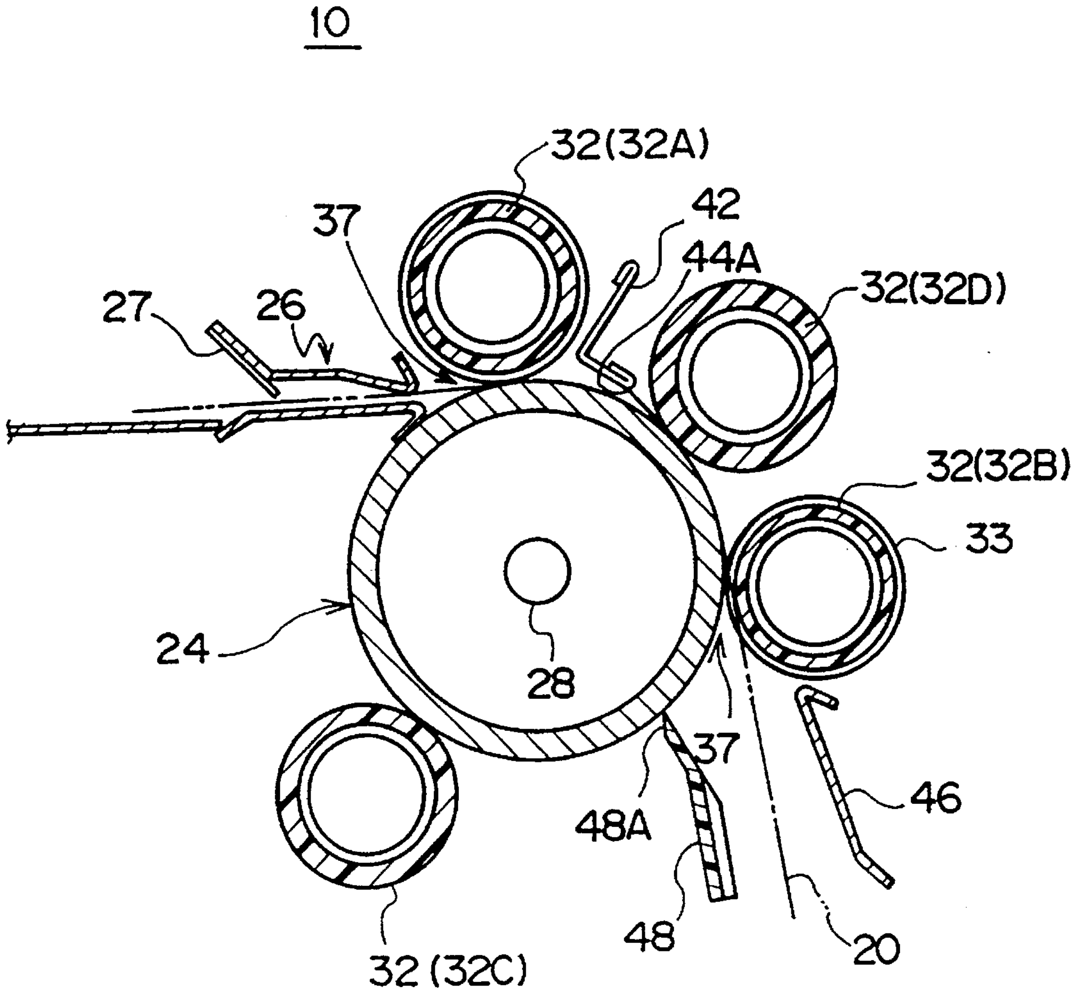
FIG. 7 is a schematic diagram of the heat roller, the backup rollers, and their vicinity in accordance with another modification of the first embodiment.

In addition, a structure in which the gaps 37 are respectively provided for both the first roller 32A and the second roller 32B may be adopted, as shown in FIG. 7. In this case, another backup roller 32 (a fourth roller 32D) is provided between the first roller 32A and the second roller 32B, and a guide plate 44A attached to the L-bracket 42 is provided on the downstream side of the first roller 32A as a guide. It should be noted that another guide plate 44A may be provided between the fourth roller 32D and the second roller 32B as well.

The light-sensitive material 20, which is transported in close contact with the heat roller 24 by the first roller 32A, the fourth roller 32D, and the second roller 32B which are arranged as described above, is heated by being brought into close contact with the peripheral surface of the heat roller 24 in the section between the first roller 32A and the second roller 32B. At this time, the steam evaporated from the light-sensitive material 20 is discharged from the gaps 37 between the first roller 32A and the heat roller 24 and between the second roller 32B and the heat roller 24. By adopting such an arrangement, the steam evaporated from the light-sensitive material 20 is allowed to escape more efficiently from between the light-sensitive material 20 and the peripheral surface of the heat roller 24.

Although, in this embodiment, the dimension of the gap 37 is made equal to the thickness of the light-sensitive material 20, it is also possible to adopt an arrangement in which the dimension of the gap 37 is made slightly larger than the thickness of the light-sensitive material 20. For instance, when the gap 37 is provided between the first roller 32A and the heat roller 24, since the light-sensitive material 20 is inserted at an angle closer to the first roller 32A than the tangential line passing through a point of contact between the peripheral surface of the heat roller 24 and the first roller 32A, even if the dimension of the gap 37 is made 1 mm larger than the thickness of the light-sensitive material 20, the light-sensitive material 20 can be transported smoothly, and uneven development does not occur in the light-sensitive material 20.

Namely, in the present invention, even if the dimension of the gap is made larger than the thickness of the light-sensitive material, a setting can be provided such that the light-sensitive material virtually comes into contact with either the backup roller or the peripheral surface of the heat roller by virtue of the angle at which the light-sensitive material is inserted into the gap (the angle with respect to the tangential line passing through a point of contact between the peripheral surface of the heat roller and the backup roller) and the rigidity of the light-sensitive material so as to allow the light-sensitive material to be transported by frictional resistance.

Referring now to FIGS. 8 to 12, a description will be given of a heat development processor in accordance with a second embodiment of the present invention.

Figure 8:
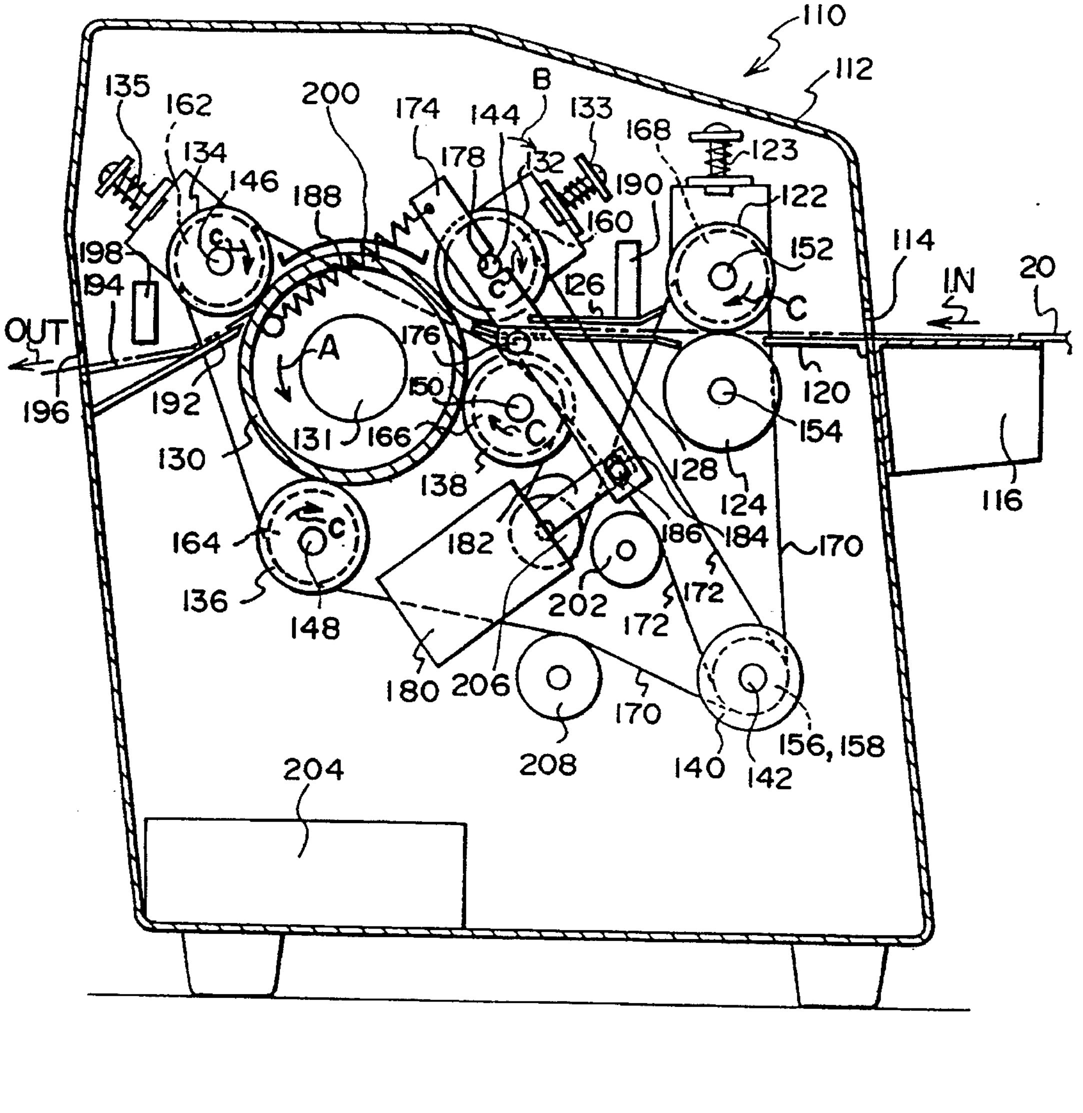
FIG. 8 is a front elevational view of a heat development processor in accordance With a second embodiment of the present invention.

As shown in FIG. 8, an inserting port 114 is provided at an upper portion of one side (on the right-hand side in FIG. 8) of a casing 112 of a heat development apparatus 110 in accordance with this embodiment. An inserting table 116 projects outwardly from the heat development apparatus 110, and the light-sensitive material 20 placed on the inserting table 116 is inserted through the inserting port 114 into the casing 112 (in the direction of arrow IN).

An inserting guide 120 is secured inside the casing 112 in correspondence with the inserting port 114. A pair of inserting rollers 122 and 124 are disposed at upper and lower positions in face-to-face relation with each other on the downstream side of the inserting guide 120. A pair of guide plates 126 and 128 are disposed at upper and lower positions in face-to-face relation with each other on the downstream side of the inserting rollers 122 and 124. A heat roller 130 is disposed on the downstream side of the guide plates 126 and 128.

A halogen lamp 131 serving as a heat source is provided coaxially in the heat roller 130, and the peripheral surface of the heat roller 130 is heated by heat radiated from the halogen lamp 131. A temperature sensor (not shown) such as a thermistor is provided on the peripheral surface of the heat roller 130. The temperature of the peripheral portion of the heat roller 130 is detected by this temperature sensor. On the basis of this detected temperature, the temperature of the peripheral portion of the heat roller 130 is maintained to a predetermined temperature ranging from 120° C. to 130° C., for example. It goes without saying that the heat source is not confined to the halogen lamp 131.

Two backup rollers 132 and 134 and two drive rollers 136 and 138 are disposed around the heat roller 130.

Of the two backup rollers, a first backup roller 132 is located on the upper side of the heat roller 130 and on the inserting side of the light-sensitive material, while a second backup roller 134 is located at substantially the same height as the first backup roller 132 and on the side away from the inserting side of the light-sensitive material. Of the two drive rollers, a first drive roller 136 is located substantially immediately below the heat roller 130, while a second drive roller 138 is located below the first backup roller 132.

The heat roller 130 is not directly supported by the casing 112. The peripheral surface of the heat roller 130 abuts against the drive rollers 136 and 138 to support a lower side of the heat roller 130, while the peripheral surface of the heat roller 130 abuts against the backup rollers 132 and 134 to support-an upper side of the heat roller 130.

A drive motor 140 is provided in a lower portion of the casing 112. A first sprocket 156 and a second sprocket 158 are coaxially fitted on a motor shaft 142 of the drive motor 140. In addition, sprockets 160, 162, 164, and 166 are respectively fitted on roller shafts 144, 146, 148, and 150 of the first and second backup rollers 132 and 134 and the first and second drive rollers 136 and 138. A sprocket 168 is fitted on a shaft of the upper inserting roller 122 of the aforementioned inserting rollers 122 and 124.

A first chain 170 is wound and trained around the first sprocket 156 of the drive motor 140, the sprockets 162, 164, and 166 of the second backup roller 134 and the first and second drive rollers 136 and 138, and the sprocket 168 of the inserting roller 122. In addition, a second chain 172 is wound around and trained between the second sprocket 158 of the drive motor 140 and the sprocket 160 of the first backup roller 132.

Idle sprockets 206 and 208 abut against the first chain 170 to maintain predetermined belt tension and save the space. An idle sprocket 202 abuts against the second chain 172 to maintain predetermined belt tension.

Accordingly, the second backup roller 134, the first and second drive rollers 136 and 138, and the inserting roller 122 are respectively rotatively driven by the drive motor 140 via the first chain 170. Also, the first backup roller 132 is rotatively driven by the drive motor 140 via the second chain 172. The first and second backup rollers 132 and 134 as well as the first and second drive rollers 136 and 138 rotate in the same direction (clockwise in FIG. 8, arrow C).

Figure 9:
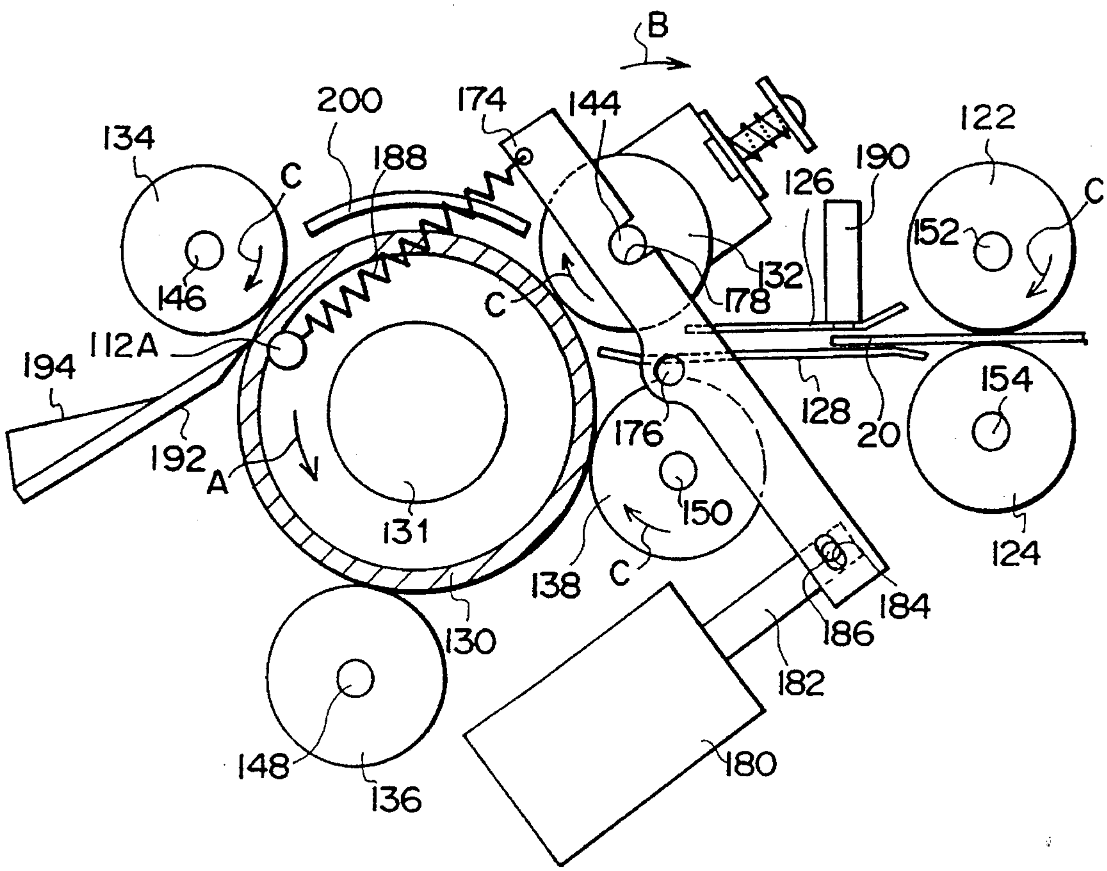
FIG. 9 is an enlarged front elevational view illustrating essential portions of the second embodiment.
Figure 10:
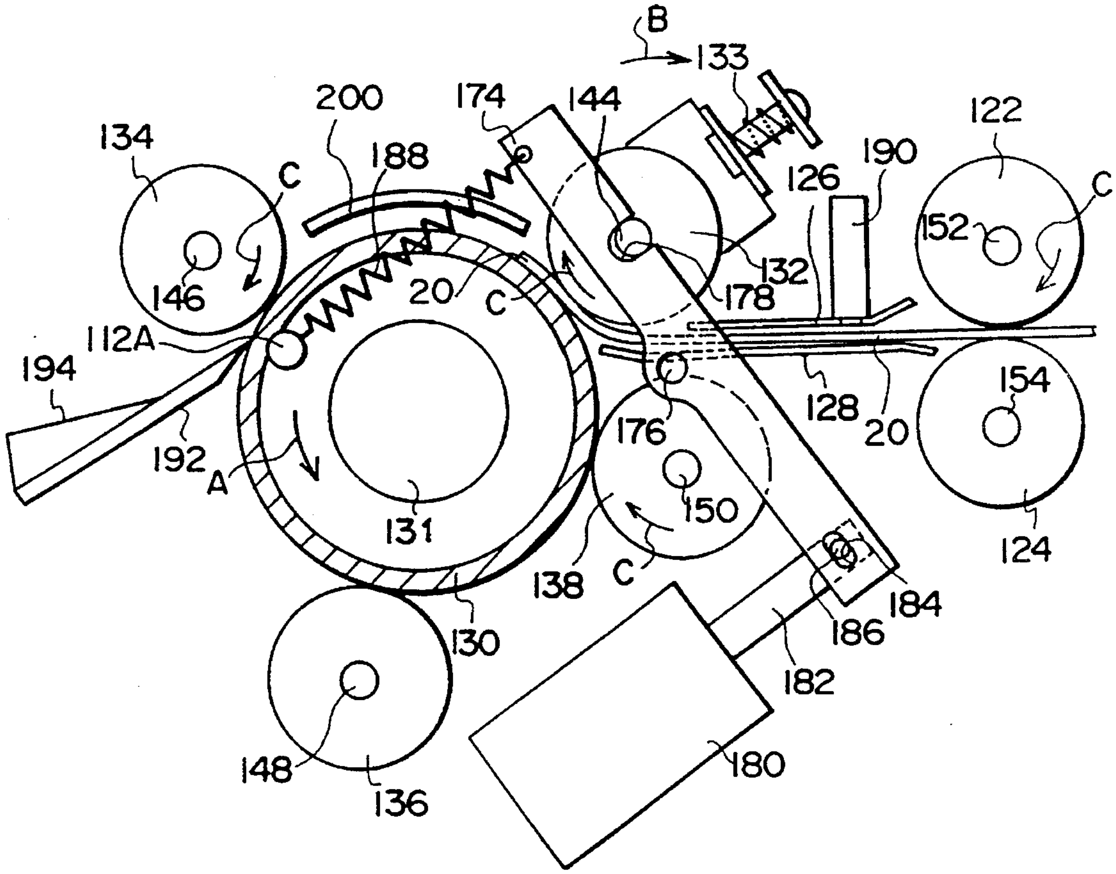
FIG. 10 is a diagram illustrating a state in which a leading end of the light-sensitive material is located between a first backup roller and a second backup roller in FIG. 9.
Figure 11:
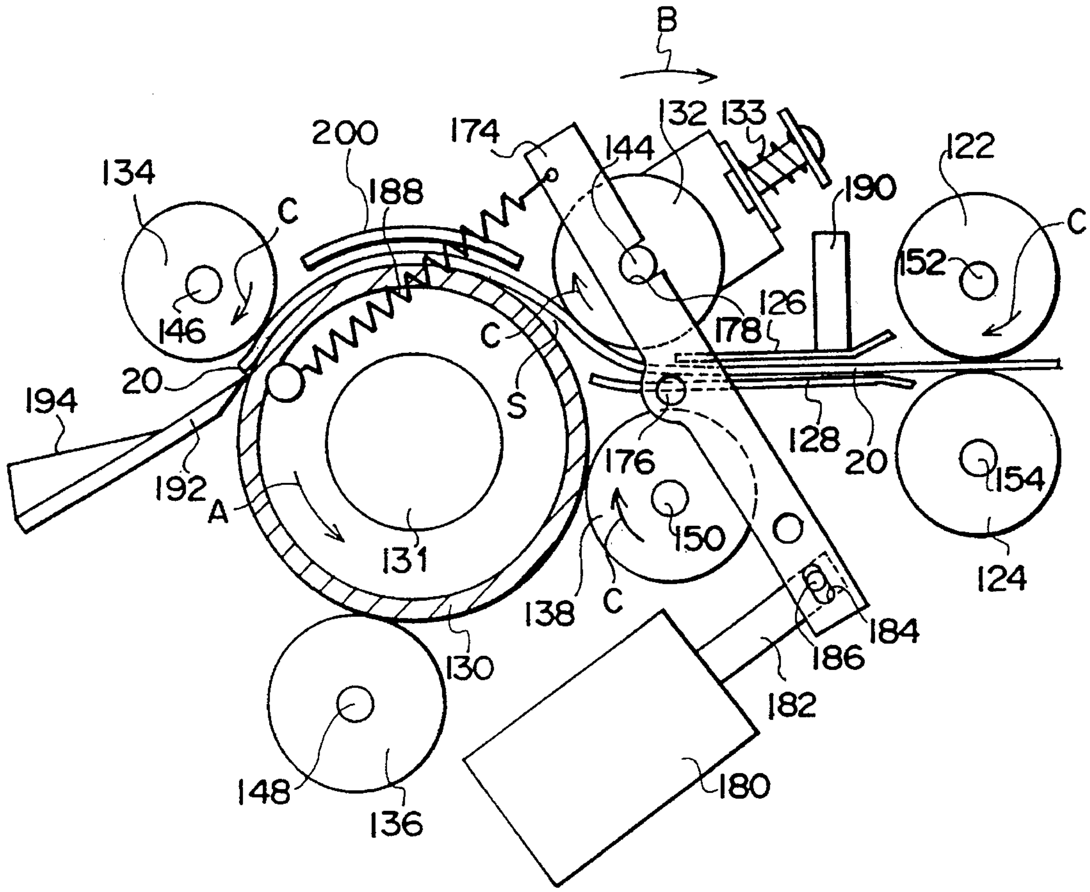
FIG. 11 is a diagram illustrating a state in which the leading end of the light-sensitive material has reached the second backup roller in FIG. 9.

The rotation of the first and second drive rollers 136 and 138 is mainly transmitted to the heat roller 130 in the form of transmission based on contact, and the heat roller 130 is rotated counterclockwise (arrow A) in FIG. 9.

Furthermore, the inserting roller 122 is also rotated in the same direction (arrow C) as the first and second backup rollers 132 and 134 and the first and second drive rollers 136 and 138. Its rotation is transmitted to the lower inserting roller 124 in the form of transmission based on contact.

The roller shaft 144 of the first backup roller 132 is capable of moving in a plane including the axis of its rotation and the axis of rotation of the heat roller 130 (a plane perpendicular to the plane including a common tangential line of the first backup roller 132 and the heat roller 130). The roller 146 of the second backup roller 134 is capable of moving in a plane including the axis of its rotation and the axis of rotation of the heat roller 130 (a plane perpendicular to the plane including a common tangential line of the second backup roller 134 and the heat roller 130).

As a result, the peripheral portions of the first and second backup rollers 132 and 134 are respectively urged by coil springs 133 and 135 in the aforementioned planes to abut against the peripheral surface of the heat roller 130, so as to produce a nipping force.

Also, the inserting roller 122 is capable of moving in a plane including the axis of its rotation and the axis of rotation of the lower inserting roller 124, and is urged by a coil spring 123 in that plane to abut against the inserting roller 124 so as to produce a nipping force.

The light-sensitive material 20 inserted through the inserting port 114 into the casing 112 is guided by the inserting guide 120, and is then nipped and transported by the inserting rollers 122 and 124. Next, the light-sensitive material 20 passes between the guide plates 126 and 128, is guided by a tip of the guide plate 128, is nipped by the peripheral portion of the first backup roller 132 and the peripheral portion of the heat roller 130, and is transported as the heat roller 130 rotates (shown in FIG. 10).

Subsequently, the light-sensitive material 20 is transported by the nipping force of the first backup roller 132 and by being guided by a holding guide 200 (which will be described later) without being dislocated from the peripheral portion of the heat roller 130. The light-sensitive material 20 is then fed into a nip between the peripheral portion of the second backup roller 134 and the peripheral portion of the heat roller 130 (shown in FIGS. 11 and 12).

As a result, the light-sensitive material 20 is transported in a state in which it is wound in such a manner as to be pressed against the peripheral portion of the heat roller 130. During this transportation, the heat on the outer surface of the heat roller 130 is transmitted to the light-sensitive material 20, and the light-sensitive material 20 is thereby heat developed.

The holding guide 200 having an arcuate shape is provided between the first backup roller 132 and the second backup roller 134 in such a manner as to oppose the peripheral portion of the heat roller 130. This holding guide 200 serves to hold the light-sensitive material 20 in contact with the peripheral portion of the heat roller 130 so as to prevent the light-sensitive material 20 from floating upward.

The outside diameters of the respective sprockets 160, 162, 164, and 166 of the first and second backup rollers 132 and 134 and the first and second drive rollers 136 and 138, the sprocket 168 of the inserting roller 122, and the sprockets 156 and 158 of the drive motor 140 are made identical, so that the light-sensitive material 20 is transported smoothly at constant velocity. Here, the speed of the transported light-sensitive material 20 is, for instance, 20 mm/sec. to 30 mm/sec.

As shown in FIGS. 8 and 9, the casing 112 is provided with an elongated rotating plate 174 constituting a roller moving means. A rotating shaft 176, which is parallel with the roller shaft 144 of the first backup roller 132, is provided in a substantially central portion, as viewed in a longitudinal direction, of the rotating plate 174. A coil spring 188 is stretched between a longitudinal end of the rotating plate 174 and a pin 112A projecting inwardly from the inner side of the casing 112. This coil spring 188 constantly urges the rotating plate 174 in such a manner as to rotate it counterclockwise (in a direction opposite to the direction of arrow B) in FIGS. 8 and 9.

A U-shaped groove 178 is formed on a transverse side of the rotating plate 174 at a position located between the rotating shaft 176 and the end of the rotating plate 174 where the coil spring 188 is attached. The roller shaft 144 of the first backup roller 132 is fitted in this U-shaped groove 178 from the side of the rotating plate 174 which is away from the heat roller side.

When the rotating plate 174 rotates clockwise (arrow B) in FIGS. 8 and 9 around the rotating shaft 176, the roller shaft 144 is pushed by the bottom of the U-shaped groove 178 in opposition to the urging force of the coil spring 133 imparting a nipping force to the first backup roller 132. As a result, the first backup roller 132 moves in the direction away from from the heat roller 130. That is, the peripheral portion of the first backup roller 132 is spaced apart from the peripheral portion of the heat roller 130.

In addition, the casing 112 is provided with a solenoid 180, and a tip of a plunger 182 of the solenoid 180 is retained, by means of a pin 186, in an elongated hole 184 formed at the longitudinal other end of the rotating plate 174. When the solenoid 180 is energized, the plunger 182 is retracted to rotate the rotating plate 174 in the direction of arrow B. When the energization of the solenoid 180 is over, the first backup roller 132 is returned to its original position where its peripheral portion abuts against the peripheral portion of the heat roller 130 by means of the urging forces of the aforementioned coil springs 133 and 188.

Of the guide plates 126 and 128, the upper guide plate 126 is provided with a detection sensor such as a photoelectric sensor 190 or the like on the side where the light-sensitive material is inserted. When the leading end of the light-sensitive material 20 passes, the passage is detected (shown in FIG. 9). Meanwhile, the drive motor 140 is provided with an unillustrated encoder, and if the passage of the leading end of the light-sensitive material 20 is detected by the photoelectric sensor 190, the position of the light-sensitive material 20 being transported can be detected on the basis of the number of subsequent revolutions of the drive motor 140. The photoelectric sensor 190, the encoder, and the solenoid 180 are connected to a control panel 204 provided in the casing 112.

In other words, after the leading end of the light-sensitive material 20 is transported by being wound around the heat roller 130, the control panel 204 energizes the solenoid 180 at a timing immediately after the passage of the leading end of the light-sensitive material 20 between the second backup roller 134 and the heat roller 130. At this timing, the control panel 204 effects control to cause the peripheral portion of the first backup roller 132 to move away from the peripheral portion of the heat roller 130 (shown in FIG. 11).

A scraper 192 is provided for the second backup roller 134 on the downstream side in the direction of travel. One end of the scraper 192 abuts against the peripheral portion of the heat roller 130 so that the scraper 192 is capable of releasing the light-sensitive material 20 from the surface of the heat roller 130, immediately after being discharged from between the second backup roller 134 and the heat roller 130. This scraper 192 is arranged in such a manner as to be inclined toward the other end thereof. The face of the aforementioned one end of the scraper 192 is cut in such a manner as to be inclined with respect to the thicknesswise direction, and is hence provided with a knife-edge shape.

Accordingly, when the leading end of the light-sensitive material 20 is released from the peripheral portion of the heat roller 130 by the scraper 192, the end face of the leading end of the light-sensitive material 20 is prevented from colliding against the end face of the scraper 192, which could otherwise result in a curl. Hence, smooth release of the light-sensitive material 20 is possible (shown in FIG. 12).

As the material of the scraper 192, it is preferable to use a heat-insulating resin material having a small thickness, such as polyethylene terephthalate (PET) used as the base of the light-sensitive material 20. In addition, the material of the scraper 192 is desirably provided with higher rigidity than the light-sensitive material 20.

Figure 12:
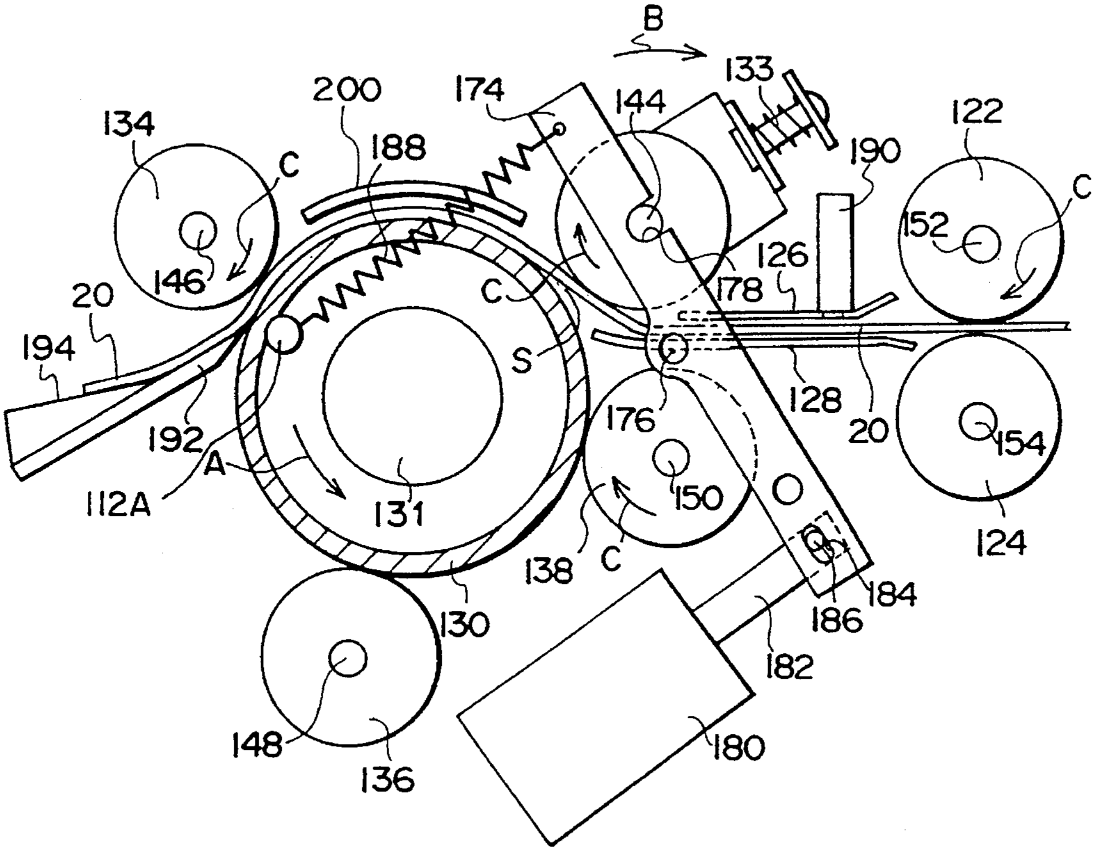
FIG. 12 is a diagram illustrating a state in which the leading end of the light-sensitive material is released by a scraper in FIG. 9.
Figure 13:
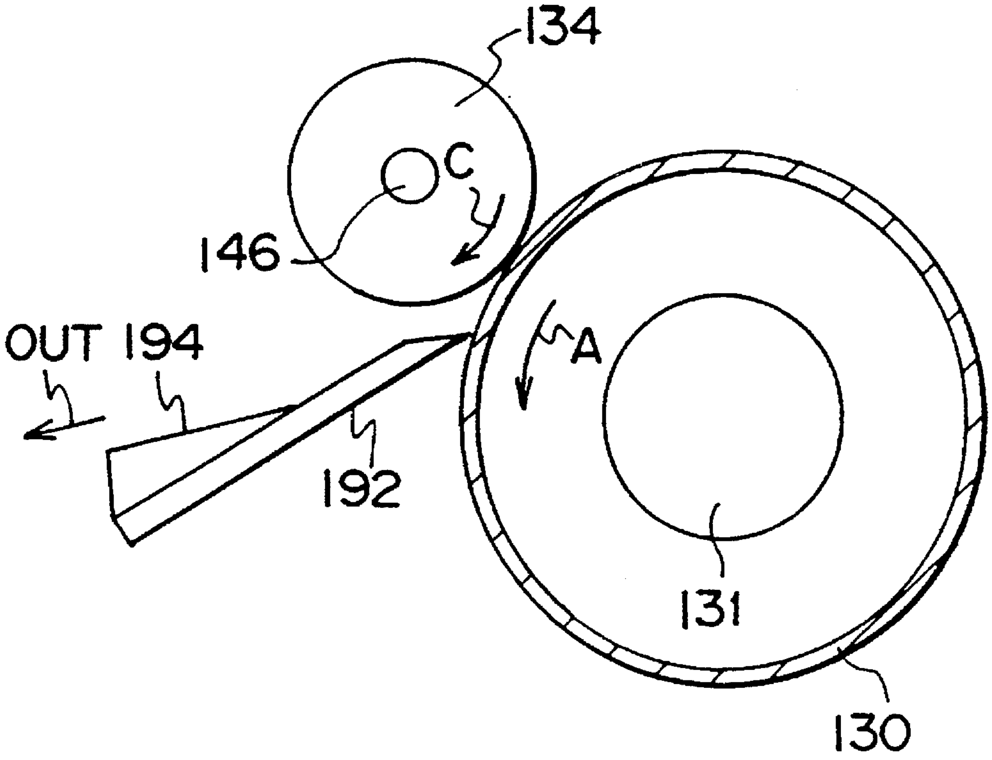
FIG. 13 is a front elevational view illustrating a modification of the scraper.

Although, as shown in FIG. 12, the aforementioned one end of the scraper 192 is inclined in the shape of a wedge in such a manner as to be cut from its side facing the heat roller 130, it goes without saying that its end face may be inclined in such a manner as to be cut from its side away from the heat roller 130, as shown in FIG. 13.

The scraper 192 is provided with a guide plate 194 having a gentler slope than the scraper 192, and the guide plate 194 is connected to a discharge port 196 which is open in the casing 112. Accordingly the light-sensitive material 20 for which development has been completed is guided by the guide plate 194 and is discharged through the discharge port 196 (arrow OUT).

A detection sensor such as a photoelectric sensor 198 is provided above the guide plate 194, and when the passage of the trailing end of the light-sensitive material 20 is detected by the photoelectric sensor 198, the energization of the solenoid 180 is stopped. As a result, the first backup roller 132 is returned to its original position for applying a nipping force, and its peripheral portion is brought into contact with the peripheral portion of the heat roller 130, so as to be ready for heat development of an ensuing sheet of light-sensitive material 20.

Next, the operation of the above-described embodiment will be described.

The first backup roller 132 is arranged to move in a direction in which its peripheral portion is spaced apart from the peripheral portion of the heat roller 130 in the course of travel of the light-sensitive material 20.

Accordingly, a necessary nipping force is secured when a large nipping force is required for transporting the light-sensitive material 20, as at the time of starting the winding of the light-sensitive material 20 such as feeding the leading end of the light-sensitive material 20 in contact with the peripheral portion of the heat roller 130.

Meanwhile, the light-sensitive material 20 is heated while the light-sensitive material 20 is being nipped and transported by the peripheral portions of the first backup roller 132 and the second backup roller 134 and the peripheral portion of the heat roller 130. For this reason, steam is released from the light-sensitive material 20 to between the light-sensitive material 20 and the heat roller 130, and bubbles are produced.

At this time, if the nipping force between the heat roller 130 and the first backup roller 132 is large, the bubbles are trapped between the light-sensitive material 20 and the heat roller 130. However, the nipping force ceases to act since the first backup roller 132 is moved in a direction in which the peripheral portion of the first backup roller 132 is spaced apart from the peripheral portion of the heat roller 130. Accordingly, the bubbles easily escape from a space S (shown in FIG. 11) formed between the light-sensitive material 20 and the heat roller 130 to the outside without being hampered by the nipping force.

After the leading end of the light-sensitive material 20 reaches the second backup roller 134, even in the state in which the peripheral portion of the first backup roller 132 is spaced apart from the peripheral portion of the heat roller 130, the light-sensitive material 20 is transported smoothly by the nipping force exerted by the heat roller 130 and the second backup roller 134.

Consequently, the process for preliminarily removing water contained in the light-sensitive material 20 becomes unnecessary, and troublesome adjustment is not required for setting the nipping force.

Hence, in heat development processing, the steam released from the light-sensitive material 20 can be reliably discharged to the outside from between the light-sensitive material 20 and the heat roller 130 and uneven development can be prevented without entailing an increase in the number of processing steps involved or making the apparatus large in size.

It should be noted that the amount of movement of the first backup roller 132 in the direction in which the peripheral portion of the first backup roller 132 is spaced apart from the peripheral portion of the heat roller 130 is set by taking the thickness and the like of the light-sensitive material 20 into consideration.

Namely, the first backup roller 132 is disposed at the position where the winding of the light-sensitive material 20 around the peripheral portion of the heat roller 130 is started on the upstream side in the direction of travel of the light-sensitive material 20. The second backup roller 134 is disposed at the position where the winding of the light-sensitive material 20 around the peripheral portion of the heat roller 130 ceases on the downstream side in the direction of travel of the light-sensitive material 20. After the leading end of the light-sensitive material 20 is nipped by the second backup roller 134 and the heat roller 130, the first backup roller 132 is moved in the direction in which the peripheral portion of the first backup roller 132 is spaced apart from the peripheral portion of the heat roller 130.

For this reason, after the leading end of-the light-sensitive material 20 is nipped by the second backup roller 134 and the heat roller 130, a nipping force necessary for transporting the light-sensitive material 20 is sufficiently secured by the second backup roller 134 without resorting to the nipping force of the first backup roller 132.

Since the nipping force of the first backup roller 132 ceases to act by moving the first backup roller 132 away from the peripheral portion of the heat roller 130, the steam produced between the light-sensitive material 20 and the heat roller 130 is squeezed out from the leading end to the trailing end of the light-sensitive material 20 and escapes from the trailing end of the light-sensitive material 20 to the outside, and its escape is made more reliable.

Although, in the above-described embodiment, the timing when the first backup roller 132 is moved by the rotating plate 174 takes place immediately after the leading end of the light-sensitive material 20 has exited the second backup roller 134 (shown in FIG. 11), the timing is not confined to the same. For instance, insofar as the light-sensitive material 20 can be transported by the transporting force of the heat roller 130 such as a frictional force acting between the heat roller 130 and the light-sensitive material 20 even if the first backup roller 132 is moved by the rotating plate 174, the position of the leading end of the light-sensitive material 20 at which the first backup roller 132 should be moved by the rotating plate 174 can be set arbitrary.

In addition, although the timing at which the first backup roller 132 is moved by the rotating plate 174 is detected by the photoelectric sensor 190 and the encoder, other appropriate means may be used to detect the timing.

Although, in the above-described embodiment, the rotating plate 174 is used as the roller moving means, it is possible to use those that are described in the third and fourth embodiments below.

Figure 14:
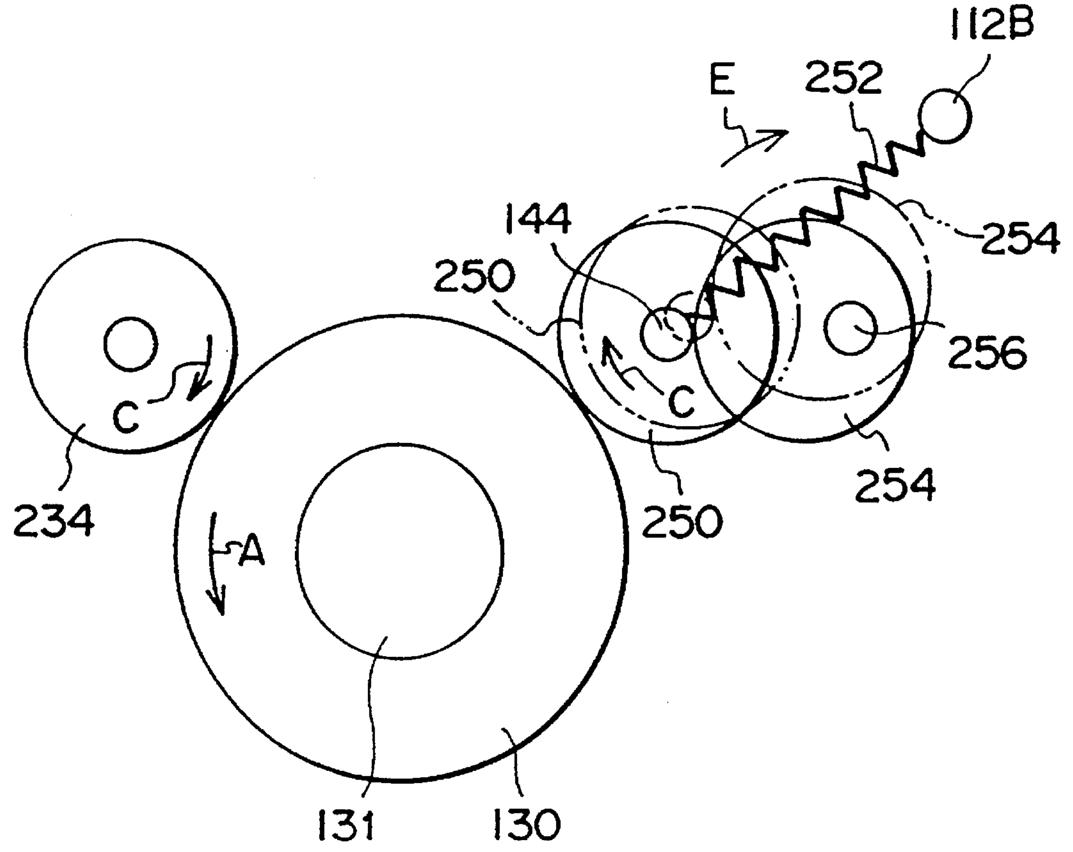
FIG. 14 is a front elevational view illustrating an essential portion of a heat development processor in accordance with a third embodiment.

As shown in FIG. 14, which shows the roller moving means in accordance with the third embodiment, the roller shaft 144 of a first backup roller 250 is provided with a coil spring 252 stretched between the roller shaft 144 and a pin 112B projecting inwardly from the inner side of the casing 112. This coil spring 252 urges the first backup roller 250 in a direction in which the peripheral portion of the first backup roller 250 is spaced apart from the peripheral portion of the heat roller 130 in a plane including the axis of rotation of the first backup roller 250 and the axis of rotation of the heat roller 130.

Meanwhile, the peripheral surface of a disk-shaped cam plate 254 having a cam shaft 256 parallel with the roller shaft 144 abuts against the peripheral portion of the roller shaft 144 of the first backup roller 250. As the cam plate 254 is rotated clockwise (arrow E) in FIG. 14 around the cam shaft 256, the first backup roller 250 moves from a position (shown by the solid line in FIG. 14) where the peripheral portion of the first backup roller 250 is brought into contact with the peripheral portion of the heat roller 130 and exerts a nipping force to a position (shown by the chain line in FIG. 14) where the peripheral portion of the first backup roller 250 is spaced apart from the peripheral portion of the heat roller 130.

Figure 15:
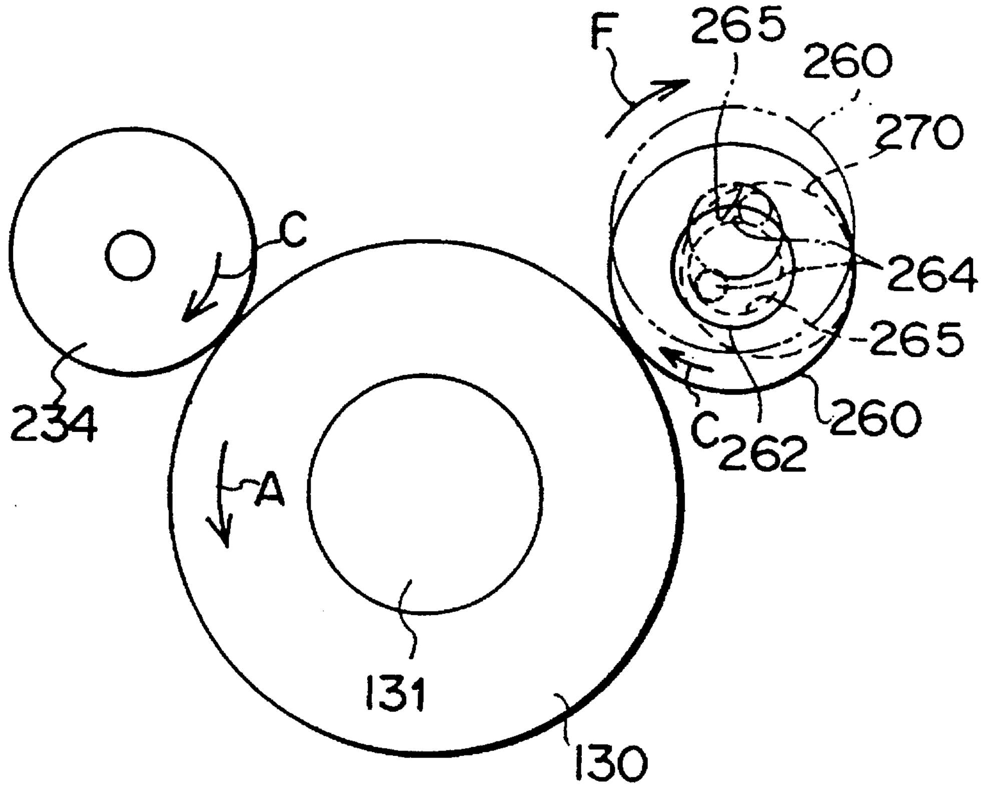
FIG. 15 is a front elevational view illustrating an essential portion of a heat development processor in accordance with a fourth embodiment.

As shown in FIG. 15, which shows the roller moving means in accordance with the fourth embodiment, a cylindrical space 265 is formed in a roller shaft 262 of a first backup roller 260, the center of the cylindrical space 264 being the same as the center of rotation of the roller shaft 262. A member 270 having a center of rotation which is offset from the center of rotation of the roller shaft 272 is provided. The member 270 has an eccentric pin 264 which is disposed eccentrically with respect to the center of rotation of the member 270 and is adapted to be inscribed in the inner periphery of the aforementioned cylindrical space 265.

As this member 270 is rotated clockwise (arrow F) in FIG. 15 with respect to the center of rotation thereof, the first backup roller 260 moves from a position (shown by the solid line in FIG. 15) where the peripheral portion of the first backup roller 260 is brought into contact with the peripheral portion of the heat roller 130 and exerts a nipping force to a position (shown by the chain line in FIG. 15) where the peripheral portion of the first backup roller 260 is spaced apart from the peripheral portion of the heat roller 130.

The other arrangements, operation, and advantages of both of these third and fourth embodiments are similar to those of the second embodiment.

It should be noted that the present invention is not limited to the above-described embodiments, and various modifications are possible. For example, although two backup rollers for pressing the light-sensitive material against the heat roller are provided in the foregoing embodiments, the number of the backup rollers provided is not limited to two, and three or more backup rollers may be provided.

Although the backup rollers are rotatively driven, they may not necessarily be rotatively driven, and it suffices if the light-sensitive material can be nipped by the backup rollers and the heat roller, and the light-sensitive material can be transported in conjunction with the rotation of the heat roller.

Furthermore, although the light-sensitive material is used for making a color proof in the foregoing embodiments, the present invention is not limited to the same, and the present invention is applicable to any light-sensitive material in which a latent image is made visible on heating.

As described above, the heat development processor in accordance with the present invention offers an outstanding advantage in that steam released from the heat-developable light-sensitive material can be reliably caused to escape and uneven development can be prevented without increasing the number of processing steps involved or making the apparatus large in size.

In addition, since a portion of the heat-developable light-sensitive material is prevented from floating up from the outer peripheral portion of the heat roller, there is an outstanding advantage in that creases or the like do not occur in the heat-developable light-sensitive material subjected to heat treatment.

Furthermore, there is an outstanding advantage in that uneven development and the scoring of the image surface can be prevented while maintaining close contact between the heat-developable light-sensitive material and the heat roller.

What is claimed is:

1. A heat development processor comprising:

a heat roller whose peripheral surface is heated to a predetermined temperature, said heat roller being adapted to transport in close contact therewith a heat-developable light-sensitive material with a latent image formed thereon, so as to heat develop the heat-developable light-sensitive material; and planar guiding means having a hydrophobic contact surface for guiding a leading end of the heat-developable light-sensitive material onto the peripheral portion of said heat roller by coming into contact with the heat-developable light-sensitive material and for bringing the heat-developable light-sensitive material into close contact with said heat roller.

2. A heat development processor according to claim 1, wherein said contact surface of said planar guiding means with respect to the heat-developable light-sensitive material is a finely coarse surface.

3. A heat development processor according to claim 2, wherein the contact surface of said planar guiding means with respect to the heat-developable light-sensitive material is 0.5 to 5 in terms of an average coarseness Ra (μm) in a JIS standard.

4. A heat development processor according to claim 2, wherein the contact surface of said planar guiding means with respect to the heat-developable light-sensitive material is formed of a fabric having 15 threads/cm or more as warp threads and weft threads, respectively.

5. A heat development processor according to claim 1, wherein a contact surface of said planar guiding means with respect to the heat-developable light-sensitive material is 0.5 to 5 in terms of an average coarseness Ra (μm) in a JIS standard.

6. A heat development processor according to claim 1, wherein the contact surface of said planar guiding means with respect to the heat-developable light-sensitive material is formed of a fabric having 15 threads/cm or more as warp threads and weft threads, respectively.

7. A heat development processor comprising:

a heat roller whose peripheral surface is heated to a predetermined temperature, said heat roller being adapted to transport in close contact therewith a heat-developable light-sensitive material with a latent image formed thereon, so as to heat develop the heat-developable light-sensitive material; and planar guiding means for guiding a leading end of the heat-developable light-sensitive material onto the peripheral portion of said heat roller by coming into contact with the heat-developable light-sensitive material and for bringing the heat-developable light-sensitive material into close contact with said heat roller, a contact surface of said planar guiding means with respect to the heat-developable light-sensitive material being a finely coarse surface which is formed of a fabric having 15 threads/cm or more of warp threads and weft threads, respectively.

8. A heat development processor comprising:

a heat roller whose peripheral portion is heated to a predetermined temperature, said heat roller being adapted to transport in close contact therewith a heat-developable light-sensitive material with a latent image formed thereon, so as to heat develop the heat-developable light-sensitive material; and a plurality of backup rollers for bringing the heat-developable light-sensitive material into close contact with said heat roller as the heat-developable light-sensitive material is fed into a nip between each of said backup rollers and said heat roller; and roller moving means for moving at least one of said plurality of backup rollers in a direction in which said at least one of said plurality of backup rollers is spaced apart from said heat roller while the heat-developable light-sensitive material is being transported wherein said backup rollers include a first backup roller for nipping the heat-developable light-sensitive material between the same and said heat roller and a second backup roller disposed on a downstream side, as viewed in a direction of travel of the light-sensitive material, of said first backup roller and adapted to nip the heat-developable light-sensitive material between the same and said heat roller and bring the heat-developable light-sensitive material into close contact with the peripheral portion of said heat roller in cooperation with said first backup roller, said roller moving means being controlled such that after a leading end of the heat-developable light-sensitive material is nipped by said second backup roller and said heat roller, said first backup roller is moved in a direction in which said first backup roller is spaced apart from said heat roller.

9. A heat development processor according to claim 8, wherein said roller moving means includes a rotating plate which is rotatable about an axis of its rotation and moves said backup roller in a direction in which said backup roller is spaced apart from said heat roller, and a solenoid for rotating said rotating plate.

* * * * *